United States Patent
Konishi et al.

(10) Patent No.: US 6,822,759 B1
(45) Date of Patent: Nov. 23, 2004

(54) IMAGE FORMING METHOD AND DEVICE

(75) Inventors: Yoshiharu Konishi, Shioziri (JP);
Hitoshi Hayama, Shiojiri (JP); Kenichi Tanabe, Tokyo (JP); Hiroshi Ono, Tokyo (JP)

(73) Assignees: Seiko Epson Corporation, Tokyo (JP); King Jim Co., Ltd., Tokyo (JP)

( * ) Notice: Subject to any disclaimer, the term of this patent is extended or adjusted under 35 U.S.C. 154(b) by 0 days.

(21) Appl. No.: 09/488,469

(22) Filed: Jan. 20, 2000

(30) Foreign Application Priority Data

Jan. 21, 1999 (JP) .......................................... 11-013616

(51) Int. Cl.[7] .............................. H04N 1/50; H04N 1/56; H04N 1/407; G06T 11/00; G06T 11/60

(52) U.S. Cl. ...................... 358/1.9; 358/2.1; 358/1.11; 358/502; 358/521; 358/530; 358/450; 345/634; 345/636

(58) Field of Search ....................... 358/1.9, 453, 448, 358/1.15, 296, 464, 461, 518, 501, 538, 465, 521; 382/274, 169, 304, 171, 199, 308, 162, 172, 205, 269

(56) References Cited

U.S. PATENT DOCUMENTS

| | | | |
|---|---|---|---|
| 6,005,967 A | * 12/1999 | Nakagawa et al. | ......... 382/154 |
| 6,062,750 A | * 5/2000 | Ueno et al. | ............. 400/615.2 |
| 6,118,427 A | * 9/2000 | Buxton et al. | .............. 345/629 |
| 6,175,663 B1 | * 1/2001 | Huang | ........................ 382/284 |
| 6,289,364 B1 | * 9/2001 | Borg et al. | ................. 715/526 |
| 6,293,717 B1 | * 9/2001 | Kurashina | ................ 400/615.2 |
| 6,404,901 B1 | * 6/2002 | Itokawa | ...................... 382/103 |
| 6,507,361 B1 | * 1/2003 | Barber | ..................... 348/207.2 |
| 6,532,078 B2 | * 3/2003 | Hayama | ..................... 358/1.15 |
| 2003/0058473 A1 | * 3/2003 | Hosokawa et al. | ........ 358/1.18 |

FOREIGN PATENT DOCUMENTS

| | | | |
|---|---|---|---|
| JP | 62-257271 | 11/1987 | .......... H04N/1/387 |
| JP | 07-200801 | 8/1995 | ............. G06T/3/00 |
| JP | 07-256972 | 10/1995 | ............ B41J/21/00 |
| JP | 09-069935 | 3/1997 | .......... H04N/1/387 |
| JP | 10-191055 | 7/1998 | .......... H04N/1/405 |

OTHER PUBLICATIONS

Adobe, "Adobe Photoshop 5.0 User Guide", 1998, Adobe Systems Integrated, version 5.0, pp. iii, iv, v, vi, vii, viii, 15–18, 105–109, 205, 214–222, 233–234, 261–264, 266, 270–271, 277, 292–293, 295, 358.*

Kang, Henry R., "Digital Color Halftoning", Nov. 11, 1999, IEEE Press, p. 251.*

* cited by examiner

Primary Examiner—Scott A. Rogers
(74) Attorney, Agent, or Firm—Hogan & Hartson, LLP

(57) ABSTRACT

A main image and a background image are formed using colors each defined by a set of n-valued basic color gradation values each having any one of n possible values (n is an integer equal to or larger than 3) and defining a gradation value of a corresponding one of a predetermined set of basic colors. Different data items representative of candidates for the background image are stored as background image data candidates. Different sets of the basic gradation values corresponding respectively to the background image data candidates are stored as candidates for a main image gradation value set commonly applied to all valid pixels of the main image. One of the background image data candidates is arbitrarily set to a background image data item representative of the background image.

24 Claims, 22 Drawing Sheets

F I G. 6 A
DD5
F I G. 6 B
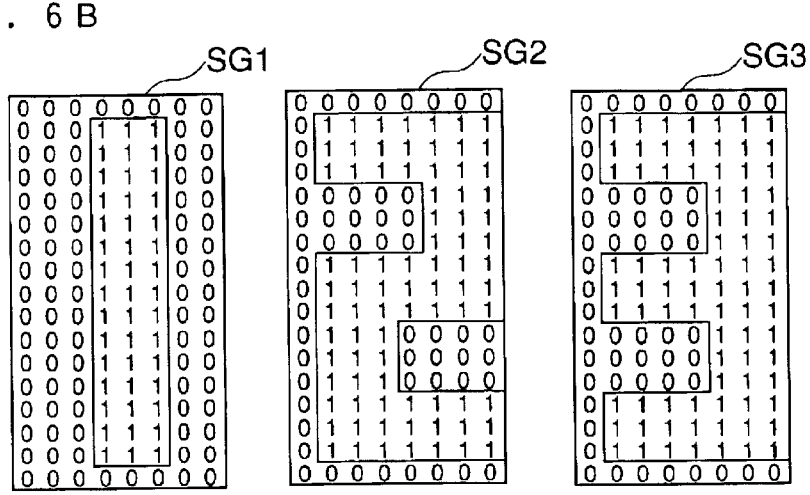
F I G. 6 C
| K(BLACK) | C | M | Y |
|---|---|---|---|
| MASK NUMBER | 4 | 4 | 4 |
CP1
| LIGHT AMARANTH | C | M | Y |
|---|---|---|---|
| MASK NUMBER | 0 | 2 | 1 |
CP2
| LIGHT YELLOW | C | M | Y |
|---|---|---|---|
| MASK NUMBER | 0 | 0 | 2 |
CP3
F I G. 6 D
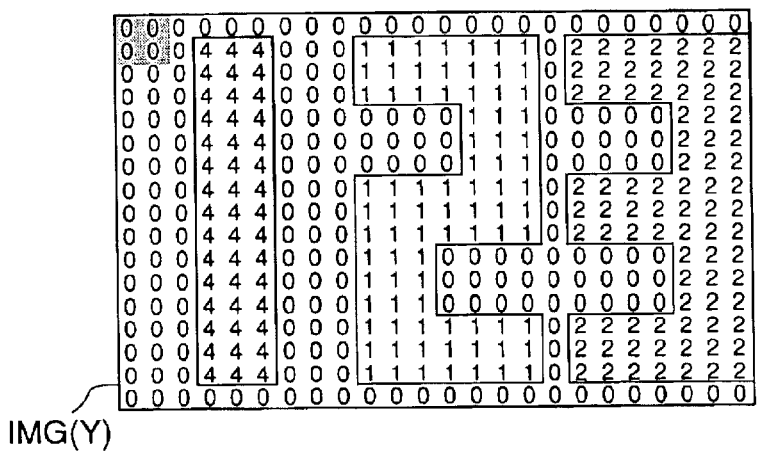
IMG(Y)

FIG. 7

| No. | TITLE OF COLOR | C | M | Y | K | C2 | M2 | Y2 |
|---|---|---|---|---|---|---|---|---|
| 1 | K (BLACK) | 4 | 4 | 4 | 4 | 0 | 0 | 0 |
| 2 | WHITE | 0 | 0 | 0 | 0 | 0 | 0 | 0 |
| 3 | DARK GRAY | 3 | 3 | 3 | 3 | 0 | 0 | 0 |
| 4 | GRAY | 2 | 2 | 2 | 2 | 0 | 0 | 0 |
| 5 | LIGHT GRAY | 1 | 1 | 1 | 1 | 0 | 0 | 0 |
| 6 | RED | 0 | 4 | 4 | 0 | 0 | 4 | 4 |
| 7 | BLUE | 4 | 4 | 0 | 0 | 4 | 4 | 0 |
| 8 | GREEN | 4 | 0 | 4 | 0 | 4 | 0 | 4 |
| 9 | CYAN | 4 | 0 | 0 | 0 | 4 | 0 | 0 |
| 10 | MAGENTA | 0 | 4 | 0 | 0 | 0 | 4 | 0 |
| 11 | YELLOW | 0 | 0 | 4 | 0 | 0 | 0 | 4 |
| 12 | LIGHT RED | 0 | 2 | 2 | 0 | 0 | 2 | 2 |
| 13 | LIGHT BLUE | 2 | 2 | 0 | 0 | 2 | 2 | 0 |
| 14 | LIGHT GREEN | 2 | 0 | 2 | 0 | 2 | 0 | 2 |
| 15 | LIGHT CYAN | 2 | 0 | 0 | 0 | 2 | 0 | 0 |
| 16 | LIGHT MAGENTA | 0 | 2 | 0 | 0 | 0 | 2 | 0 |
| 17 | LIGHT YELLOW | 0 | 0 | 2 | 0 | 0 | 0 | 2 |
| 18 | AMARANTH | 0 | 4 | 2 | 0 | 0 | 4 | 2 |
| 19 | LIGHT AMARANTH | 0 | 2 | 1 | 0 | 0 | 2 | 1 |
| 20 | ORANGE | 0 | 2 | 4 | 0 | 0 | 2 | 4 |
| 21 | LIGHT ORANGE | 0 | 1 | 2 | 0 | 0 | 1 | 2 |
| 22 | YELLOWISH GREEN | 4 | 0 | 2 | 0 | 4 | 0 | 2 |
| 23 | LIGHT YELLOWISH GREEN | 2 | 0 | 1 | 0 | 2 | 0 | 1 |
| 24 | DARK RED | 2 | 4 | 4 | 2 | 0 | 4-2 | 4-2 |
| 25 | DARK ORANGE | 1 | 2 | 3 | 1 | 0 | 2-1 | 3-1 |

DGC(DGK)

DGM

PGC(PGK)

PGM

DGK

DGC2

DGM2

DGY2

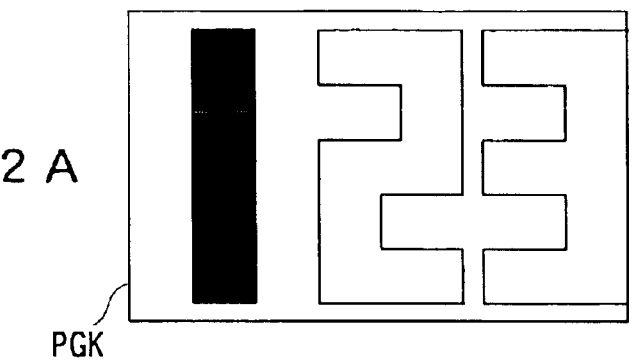
F I G. 1 2 A
PGK
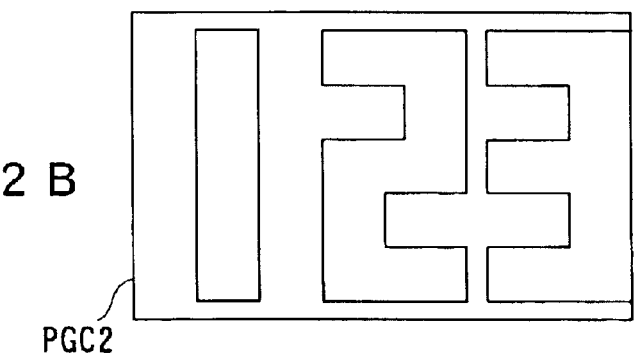
F I G. 1 2 B
PGC2
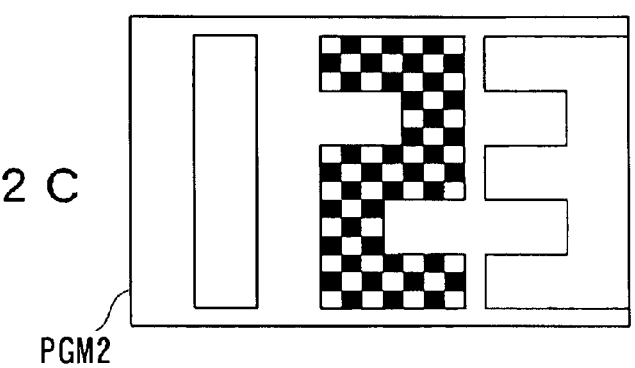
F I G. 1 2 C
PGM2
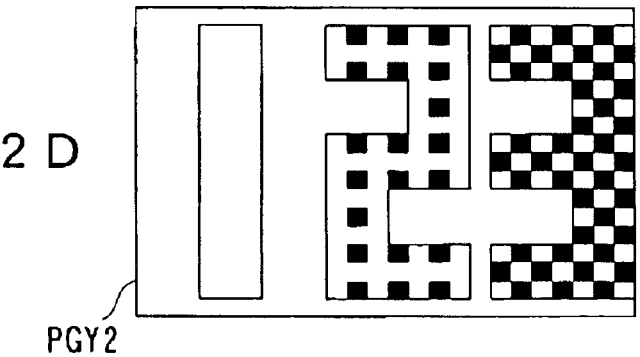
F I G. 1 2 D
PGY2

F I G. 1 7
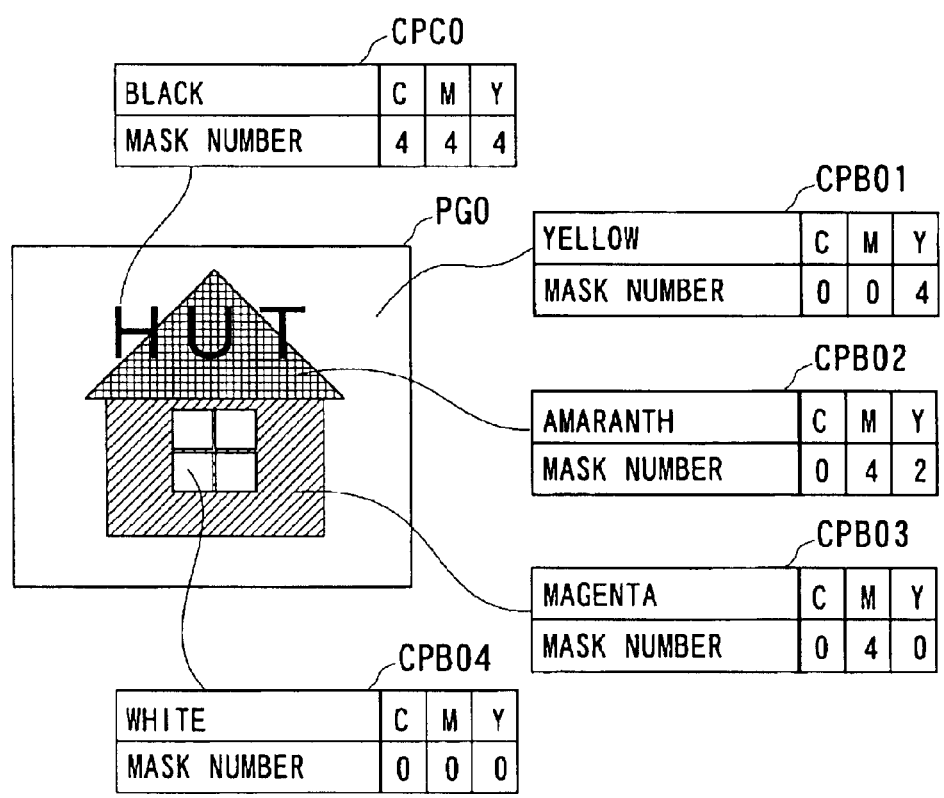

IMAGE FORMING METHOD AND DEVICE

BACKGROUND OF THE INVENTION

FIELD OF THE INVENTION

This invention relates to an image forming method and device for forming a synthesized image by synthesizing a main image with a background image.

PRIOR ART

Conventionally, in an image forming device of this kind, a synthesized image is formed by synthesizing main images with background images with preference to the pixels of the main images. In general, main images, background images and synthesized images are represented by image data formed of dot matrices having gradation values representative of gradation levels of pixels of the images assigned to matrix elements thereof, and processed based thereon. For instance, when a main image and a background image are images of characters (letters, numerals, symbols, simple figures, etc.) which can be entered via a keyboard (as text data), main image data representative of the main image and background image data representative of the background image can be formed and stored (registered) by conversion of the text data based on a predetermined font (outline font, bit map font or the like). When the main image and the background image are images which cannot be entered as text data, main image data and background image data representative of the respective images can be also formed and stored (registered) by plotting them as dot images by utilizing e.g. the function of registering nonstandard characters (nonstandard character registration) or the function of registering plotted images (plotted image registration).

Further, in the image forming device of the above-mentioned kind, normally, gradation values representative of gradation levels of pixels of each image can be designated or set before or after the image is formed, and information of the gradation values is stored as image data information. In the case of a monochrome image, gradation values thereof represent gray tones of its pixels. On the other hand, in producing a color image, if colors are designated for portions of the color image, each color is decomposed into gradation values of basic colors, and information of the gradation values is stored as image data information. In this case, when a print image is formed, three primary colors consisting of C (cyan), M (magenta) and Y (yellow) or the three primary colors plus K (black) are employed as the basic colors, whereas when a display image is formed, R (red), G (green) and B (blue) are used as the basic colors.

The above main image and background image are not necessarily formed or stored (registered) as image elements to be formed into a synthesized image from the beginning, that is, such images for synthesis from the beginning. More often, they are formed so as to be separately displayed or printed as individual images. Further, in forming a synthesized image, if image elements (main images and background images) are first formed and stored (registered) with a view to producing a synthesized image, and then synthesized by a further step, the synthesized image, i.e. an image identical to the synthesized image can be obtained more easily if the image itself is formed from the beginning. Therefore, in general, synthesis of images is carried out, when the images are already stored (registered) and hence the use of these images as main images and background images of a synthesized image saves or reduces the trouble of forming the synthesized image, as compared to the case where a desired image is newly produced.

However, the above-mentioned images formed for being separately displayed or printed as individual images are not formed in anticipation of synthesis, so that a synthesized image formed by using any of them as main and background images can be hard to view or recognize and unattractive due to the unbalanced relationship between the densities and tones of colors of the images depending on a combination thereof.

SUMMARY OF THE INVENTION

It is an object of the invention to provide an image forming method and device which is capable of forming a synthesized image with excellent appearance, by synthesizing a main image having a color suitable for the color of a background image and the background, while making use of an existing image as the background image.

To attain the above object, there is provided an image forming method of forming a main image and a background image serving as a background of the main image by using colors each defined by a set of n-valued basic color gradation values each having any one of n possible values (n is an integer which is equal to or larger than 3) and defining a gradation value of a corresponding one of a predetermined set of basic colors, and synthesizing the main image and the background image, to thereby form a synthesized image.

The image forming method is characterized by comprising the steps of:

storing a plurality of different color data items respectively representative of candidates for the background image, as background image data candidates:

storing a plurality of different sets of the n-valued basic color gradation values, the different sets corresponding to respective ones of the background image data candidates, as candidates for a main image gradation value set of the n-valued basic color gradation values commonly applied to all valid pixels of the main image;

setting an arbitrary one of the background image data candidates to a background image data item representative of the background image;

setting, out of the candidates for the main image gradation value set, one corresponding to the background image represented by the background image data item to the main image gradation value set;

forming a main shape image data item representative of the main image by assigning a validity-indicative one of predetermined two values to all pixels of a main shape image forming a shape of the main image as the all valid pixels of the main image, and assigning an invalidity-indicative one of the predetermined two values to the remaining pixels of the main image; and forming a synthesized image data item representative of the synthesized image by synthesizing the main image and the background image based on a main image data item representative of the main image and the background image data item, the main image data item having the main image gradation value set and the main shape image data item.

To attain the above object, according to a second aspect of the invention, there is provided an image forming device for forming a main image and a background mage serving as a background of the main image by using colors each defined by a set of n-valued basic color gradation values each having any one of n possible values(n is an integer which is equal to or larger than 3) and defining a gradation value of a corresponding one of a predetermined set of basic colors and synthesizing the main image and the background image, to thereby form a synthesized image.

The image forming device according to the second aspect of the invention is characterized by comprising:

background image data candidate storage means for storing a plurality of different image data items respectively representative of candidates for the background image, as background image data candidates;

main image gradation value set candidate storage means for storing a plurality of different sets of the n-valued basic color gradation values, the different sets corresponding to respective ones of the background image data candidates, as candidates for a main image gradation value set of the n-valued basic color gradation values commonly applied to all valid pixels of the main image;

background image-setting means setting an arbitrary one of the background image data candidates to a background image data item representative of the background image;

main image gradation value set-setting means for setting, out of the candidates for the main image gradation value set, one corresponding to the background image represented by the background image data item to the main image gradation value set;

main shape image data-forming means for forming a main shape image data item representative of the main image by assigning a validity-indicative one of predetermined two values to all pixels of a main shape image forming a shape of the main image as the all valid pixels of the main image, and assigning an invalidity-indicative one of the predetermined two values to the remaining pixels of the main image; and synthesized image data-forming means for forming a synthesized image data item representative of the synthesized image by synthesizing the main image and the background image based on a main image data item representative of the main image and the background image data item, the main image data item having the main image gradation value set and the main shape image data item.

According to the image forming method and device, a main image and a background image serving as a background of the main image are formed using colors each defined by a set of n-valued basic color gradation values each having any one of n possible values (n is an integer which is equal to or larger than 3) and defining a gradation value of a corresponding one of a predetermined set of basic colors, and the main image and the background image are synthesized to thereby form a synthesized image. More particularly, a plurality of different main data items respectively representative of candidates for the background image are storing as background image data candidates, and a plurality of different sets of the n-valued basic color gradation values, which correspond to respective ones of the background image data candidates, are stored as candidates for a main image gradation value set of the n-valued basic color gradation values commonly applied to all valid pixels of the main image. An arbitrary one of the background image data candidates is set to a background image data item representative of the background image. Out of the candidates for the main image gradation value set, one corresponding to the background image represented by the background image data is set to the main image gradation value set. A main shape image data item representative of a main shape image forming a shape of the main image is formed by assigning a validity-indicative one of predetermined two values to all pixels of the main shape image as the all valid pixels of the main image, and assign an invalidity-indicative one of the predetermined two values to the remaining pixels of the main image. A synthesized image data item representative of the synthesized image is formed by synthesizing the main image and the background image based on a main image data item representative of the main image and the background image data item, the main image data item having the main image gradation value set and the main shape image data item.

That is, by storing a plurality of different existing images as candidates for the background image, and selecting a desired one of the candidates for use as the background image, it is possible to form a synthesized image by synthesizing the main image and the background image such that the former is superimposed on the latter. Further, since a plurality of sets of main image gradation values are stored as candidates for a main image gradation value set in a manner correlated to a plurality of candidates for the background image, respectively and one of the candidates for the main image gradation value set corresponding to a background image is set to the main image gradation value set, it is possible to form a synthesized image excellent in appearance in which the main image having a color suitable of the color of the background image is formed on the background image, by storing sets of gradation values of colors suitable for respective ones of the candidates for the background image, as the candidates for the main image gradation value set, and setting one of these candidates corresponding to the background image to the main gradation value set. In this case, the main image data representative of the main image has the main image gradation value set and the main shape image data. As the background image data, there can be used image data (matrices) having gradation value sets (background gradation value sets) respectively corresponding to individual pixels of the background image as matrix elements. However, when the background image is a single image element or can be divided into at least two image elements whose valid pixels grouped all have an identical set of gradation values, each background image data item may be formed to have numerical data (background gradation value set) representative of a set of gradation values (background gradation values for each image element), and a two-valued (binary) matrix indicative of only the validity/invalidity of each pixel of the background image, to thereby save the capacity of a memory device, similarly to the main image data item.

Preferably, the background image data candidates include image data items each representative of a dot image formed by inputting data of dots as desired.

According to this preferred embodiment of each aspect of the invention, the background image data candidates include image data items each representative of a dot image formed by inputting data of dots as desired. That is, it is possible to make use of images formed by the user by inputting data of dots as desired. For this entry of data, the functions of non-standard character data registration or depicted image data registration can be made use of.

Preferably, the step of forming the main shape image data item comprises the steps of inputting text data as a source of the main image; and converting the text data into image data based on predetermined font data to thereby form the main shape image data item.

Preferably, the image forming device includes font storage means for storing predetermined font data, and the main shape image data-forming means comprises text data-inputting means for inputting text data as a source of the main image, and conversion means for converting the text data into image data based on predetermined font data to thereby form the main shape image data item.

According to these preferred embodiments, text data as a source of the main image is input and then, the text data is converted into image data based on predetermined font data to thereby form the main shape image data item. That is, text data is input e.g. by keys of a keyboard, and then simply converted into image data based on the predetermined font to thereby form a main shape image data item representative of the shape of the main image with ease.

More preferably, aid predetermined font data is outline font data.

The outline font is defined by coordinates of points on a contour line and attributes thereof, and hence the process of forming an image based on the outline font is generally executed by carrying out a contour-plotting process (contour line image-forming process: process of assigning a validity-indicative one (valid value) of the validity-indicative and invalidity-indicative values to matrix elements forming the contour line) and a so-called filling process (process of filling the inside of a contour line: process of assigning the valid value to all the matrix elements inside the contour line). As a result, main shape image data in which all the matrix elements corresponding to all the pixels inside the contour line of the main image indicate the valid value can be created by a general image-forming method carried out based on the outline font. Further, as described above, the main image data has the main image gradation value set and the main shape image data and represents the main image. Therefore, only provision of the main image gradation value data permits the main shape image data to be formed with ease. That is, this enables the main shape image data to be formed with ease, and hence permits the main image data to be formed with ease.

Preferably, the plurality of basic colors include three primary colors, the three primary colors being cyan, magenta, and yellow.

According to this preferred embodiment of each aspect of the invention, the plurality of basic colors include three primary colors, and the three primary colors are cyan, magenta, and yellow. That is, various colors can be expressed by a subtractive color mixing process. Therefore, it is possible to color print images suitable for expressing colors by reflected light, such as those formed by various XY plotters, printers, and the like.

More preferably, the plurality of basic colors include a basic color corresponding to a mixed color of the three primary colors.

According to this preferred embodiment of each aspect of the invention, the plurality of basic colors include a basic color corresponding to a mixed color of the three primary colors. When color images are printed by using the plurality of basic colors, e.g. a mixture of C (cyan), M (magenta), and Y (yellow), for instance, forms K (black). In general, provision of ink of K (black) makes it possible to obtain beautiful tone of black color than the use of the K (black) formed by mixing the primary colors. Therefore, since the plurality of basic colors include the basic color corresponding to the mixed color of the three primary colors, beautiful color images can be printed by using the four basic colors. That is, according to this preferred embodiment of each aspect of the invention, since the plurality of basic colors include a basic color corresponding to a mixed color of the three primary colors, more suitable color images can be formed in forming color print images in which colors are expressed using reflected light.

Preferably, the synthesized image is formed as a print image to be printed on a printing object.

According to this preferred embodiment of each aspect of the invention, since the synthesized image is formed as a print image to be printed on a printing object, the invention can be applied to a printing apparatus.

More preferably, the printing object is a tape.

According to this preferred embodiment of each aspect of the invention, since the printing object is a tape, it can be applied to a tape printing apparatus.

More preferably, the print image is printed by an ink jet printing method.

According to this preferred embodiment of each aspect of the invention, since the print image is printed by an ink jet printing method, the invention can be applied to a printing apparatus using the ink jet printing method.

More preferably, the plurality of basic colors include three primary colors, the three primary colors being red, green, and blue.

According to this preferred embodiment of each aspect of the invention, the three primary colors are red, green, and blue. That is, various colors can be expressed by a so-called additive color mixing process, and the image forming process in this case is suitable for a case where illuminants, such as CRTs, liquid crystal displays, and plasma displays, emit light for representation of colors. In addition, in this case, the mixture (mixed color) of the colors R, G, and B results in white.

Preferably, the synthesized image is formed as a display image to be displayed on a display screen.

According to this preferred embodiment of each aspect of the invention, since the synthesized image is formed as a display image to be displayed on a display screen, the invention can be applied to a display device.

Preferably, the image forming method further includes the steps of determining whether or not an automatic main gradation value adjustment should be executed to automatically set the one corresponding to the background image represented by the background image data item to the main image gradation value set; and the step of setting the one corresponding to the background image represented by the background image data item to the main image gradation value set includes executing the automatic main gradation value adjustment to automatically set the one corresponding to the background image represented by the background image data item to the main image gradation value set when it is determined that the automatic main gradation value adjustment should be executed.

Preferably, the image forming device further includes automatic main gradation value adjustment-determining means for determining whether or not an automatic main gradation value adjustment should be executed to automatically set the one corresponding to the background image represented by the background image data item to the main image gradation value set; and the main image gradation value set-setting means executes the automatic main gradation value adjustment to automatically set the one corresponding to the background image represented by the background image data item to the main image gradation value set when it is determined that the automatic main gradation value adjustment should be executed.

According to this preferred embodiment of each aspect of the invention, it is determined whether or not the automatic main gradation value adjustment should be executed to automatically set the one corresponding to the background image represented by the background image data item to the main image gradation value set, and when it is determined that the automatic main gradation value adjustment should be executed, the automatic main gradation value adjustment is executed to automatically set the one corresponding to the background image represented by the background image data item to the main image gradation value set. That is, it is possible to determine whether the automatic main gradation value adjustment should be executed, and if the automatic main gradation value adjustment is not determined to be executed, the main gradation values can be set manually or by another suitable means, or by a default value, or by stopping forming of the synthesized image. This makes it possible to improve the operability and the capability of the image forming process.

To attain the above object, according to a third aspect of the invention, there is provided a image forming method comprising the steps of:

storing a plurality of different color images as background image candidates;

selecting one of the plurality of different color images as a background image:

setting a color of a main image according to the background image selected; and forming a synthesized image by synthesizing the main image and the background image.

According to this image forming method, a plurality of different color images are stored as candidates for a background image, and one of the plurality of different color images is selected as the background image. Then, a color of a main image is set according to the background image selected. Then, a synthesized image is formed by synthesizing the main image and the background image. Therefore, it is possible to form a synthesized image with excellent appearance, by synthesizing a main image having a color suitable for the color of a background image and the background, while making use of an existing image as the background image.

The above and other objects, features, and advantages of the invention will become more apparent from the following detailed description taken in conjunction with the accompanying drawings.

BRIEF DESCRIPTION OF THE DRAWINGS

FIG. 6A is a diagram illustrating an example of dither matrix;

FIG. 6B is a diagram illustrating an example of main shape image data;

FIG. 6C is a diagram illustrating an example of color palette data;

FIG. 6D is a diagram illustrating an example of gradation image data corresponding to the dither matrix, the main shape image data and the color palette data;

FIG. 7 is a diagram illustrating an example of a color conversion table;

FIGS. 12A, 12B, 12C and 12D are diagrams illustrating examples of print images corresponding to FIGS. 11A, 11B, 11C and 11D, respectively;

FIG. 17 is a diagram similar to FIG. 13, which illustrates a synthesized image formed by synthesizing the FIG. 15A main image with the FIG. 15B background image by a first synthesized image-forming method;

DETAILED DESCRIPTION

The invention will now be described in detail with reference to the drawings showing an embodiment thereof. In the embodiment, an image forming method and device according to the invention is applied to a tape printing apparatus.

Figure 1:
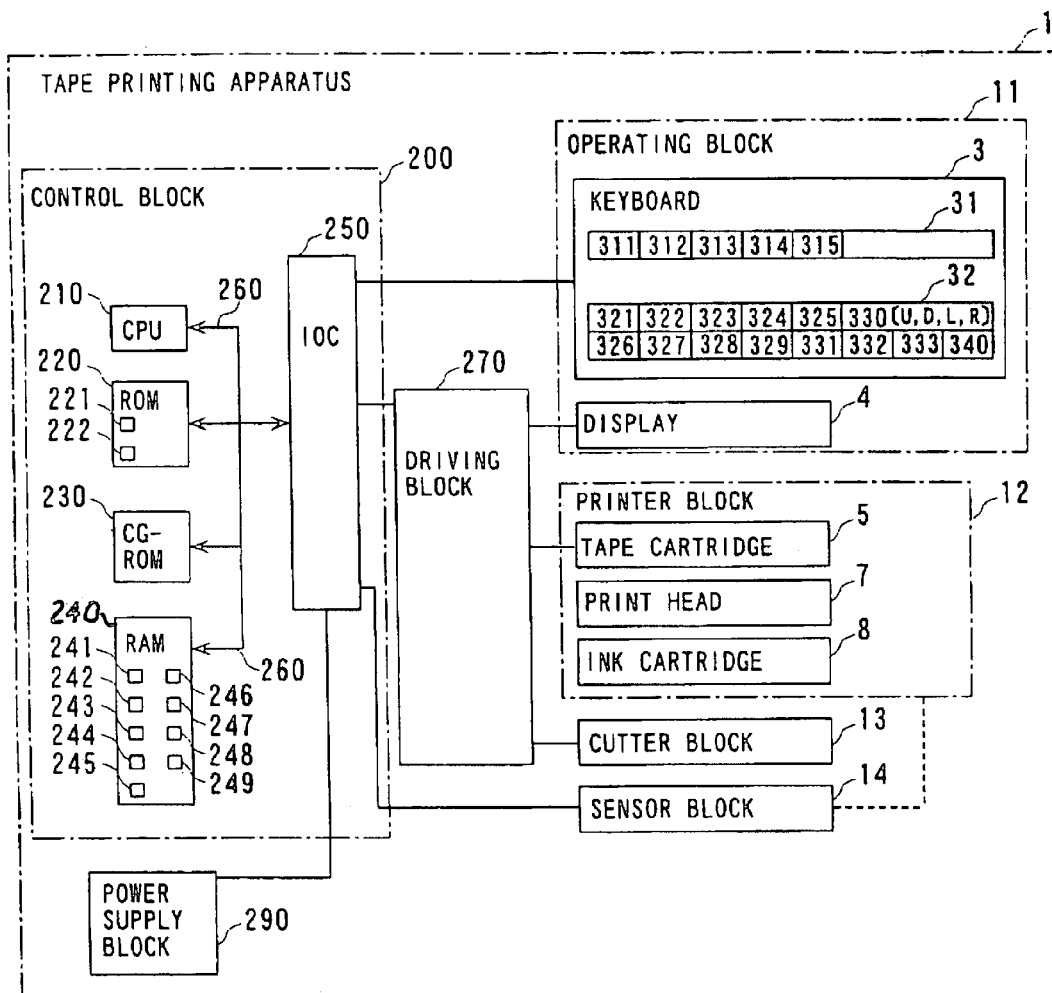
FIG. 1 is a block diagram showing the arrangement of a tape printing apparatus 1 to which is applied an image forming method and device according to an embodiment of the invention.

Referring first to FIG. 1, there is shown the arrangement of the tape printing apparatus 1 which is capable of carrying out color printing of a print image on a printing tape T1 by an ink jet printing method and cutting off the printed portion of the printing tape T1 to thereby produce a label. The print image is formed based on desired characters and the like entered via a keyboard of the apparatus. Further, the tape printing apparatus 1 is capable of having not only the printing tape T1 but also a laminating tape T2 mounted therein to thereby affix the laminating tape T2 to a printed portion of the printing tape T1 and cut the printing tape T1 and the laminating tape T2 in the laminated state, for producing a laminated label. Hereinafter, a type of tape formed of only the printing tape T1 and a type of tape including the laminating tape T2 in addition to the printing tape T1 will be generically referred to as the "tape T".

The printing tape T1 is comprised of a substrate tape, an adhesive layer coated on a underside surface of the substrate tape, and a release paper tape affixed to the adhesive layer. The substrate tape is formed of a material which is capable of readily absorbing ink, such as paper, paper with a coated layer or a film with a coated layer. The adhesive layer is used for affixing a printing tape T1 as a label to an object article, such as a file, while the release paper tape is used for preventing dust or dirt from depositing on the adhesive layer. On the other hand, the laminating tape T2 is comprised of a substrate tape, and an adhesive layer coated on a underside surface of the substrate tape. The substrate tape is formed of a transparent film having a thickness of approximately 16 to 38 μm. The printing tape T1 and the laminating tape T2 are fabricated to have approximately identical widths and affixed to each other in a manner such that side edges thereof are aligned one upon the other. Actually, the laminating tape T2 has a slightly smaller width (by approximately 0.3 mm) than the printing tape T1 such that slight lateral displacement of the laminating tape T2 can be accommodated when the same is affixed to the printing tape T1.

Tape cartridges are provided which contain various (approximately ten) kinds of tapes T with various tape widths of from 4.5 mm to 96 mm. A print image having a resolution of 24 to 1024 dots in the direction of the width thereof is printed on the printing tape T, dependent on the width thereof. It should be noted that there are provided still other tapes T different in material or having background colors other than white. Therefore, it is possible to use at least several tens of kinds of tapes T including ones to be adopted in the future. The tape cartridges 5 are classified into a type which contains both the printing tape T1 and the laminating tape T2 and another type which contains only the printing tape T1, and each type include a plurality of kinds of tape cartridges different in width.

As shown in FIG. 1, the tape printing apparatus 1 is basically comprised of an operating block 11 having the keyboard 3 and the display 4 and interfacing with the user, a printer block 12 having a print head 7 of an ink jet type for printing on a tape T (printing tape T1) unwound from the tape cartridge 5, a cutter block 13 for cutting off the printed portion of the tape T, a sensor block 14 having various sensors for carrying out various detecting operations, a driving block 270 having drivers for driving circuits of blocks and devices, a power supply block 290, and a control block 200 for controlling operations of components of the tape printing apparatus 1 including the sensors and drivers. To implement the above construction, the apparatus accommodates a circuit board, not shown, in addition to the printer block 12, the cutter block 13, the sensor block 14 and so forth. On the circuit board are mounted the power supply block 290 and the circuits of the driving block 270 and the control block 200. The power supply unit of the power supply block 290 is connected to a connector socket connectable with an AC adapter and a battery.

Although illustration and indication of each component are omitted, the printer block 12 includes a carriage motor (CR motor) which moves a carriage slidably attached to a carriage guide shaft, in the direction of the width of the tape T in a reciprocating manner. Further, the printer block 12 includes feed roller means which is comprised of a feed driven roller positioned above and a feed drive roller positioned below and presses the printing tape T1 unwound from the tape cartridge 5 in a manner sandwiching the tape between the rollers, to thereby feed or advance the tape, laminating roller means which is comprised of a laminating driven roller positioned above and a laminating drive roller positioned below, and while pressing the printing tape T1 and the laminating tape T2 in a manner sandwiching the tapes T1 and T2 between the rollers, for affixing the tapes to each other, advances the tapes to send them out through a tape exit in the form of a slit, and a tape feed motor (TF motor) for driving the feed roller means and the laminating roller means for rotation via a reduction gear train, not shown. The printer block 12 further includes a head cap mechanism, not shown, for closing the ink nozzles of the print head 7 as well as cleaning the same by using a pump motor, not shown, as required, and a latching mechanism for setting the tape cartridge 5 in the tape printing apparatus 1.

The tape cartridge 5 includes a discriminating plate that provides discriminating information based on bit patterns or the like. A tape-discriminating sensor mounted on the above-mentioned carriage is caused to face toward the discriminating plate to thereby detect a kind of the tape cartridge 5, a type of the printing tape T1, a type of the laminating tape T2 and a print-starting position at which the printing tape T1 starts to be printed, and deliver (report) a signal (tape-discriminating signal) indicative of the sensed types and print-starting position to the control block 200. The carriage has the print head 7 integrally mounted at a lower portion thereof in a manner facing downward, for printing on the tape T, and a cartridge holder at an upper portion thereof, for holding therein the ink cartridge 8 for supplying ink to the print head 7. The ink cartridge 8 is held in the cartridge holder in a manner facing downward. When the ink cartridge 8 is loaded in the cartridge holder, four ink reservoirs of respective colors of ink are communicated with the print head 7 to allow ink to flow from the ink cartridge 8 to the print head 7. The ink reservoirs are filled with C (cyan) ink, M (magenta) ink, Y (yellow) ink, and K (black) ink, respectively.

Further, the carriage has light shields, not shown, projecting therefrom. When one of the light shields is brought before a home position sensor comprised of a photo interrupter or the like, it detects that the print head 7 is at a home position, and supplies (reports) a signal (position-detecting signal) indicative of detection of the home position of the print head 7 to the control block 200, whereby the correction of the position of the print head 7, such as zero position adjustment, is carried out. The home position serves not only as a standby position of the print head 7 but also as a reference position for printing. The CR motor is driven for rotation in a predetermined number of steps to move the print head 7 from the reference position, whereby the carriage is moved with accuracy to each predetermined position in the direction of the width of the tape T within a printing range, and the print head 7 is driven for printing in synchronism with movement of the carriage to thereby effect printing of characters and figures on a surface of the tape T in a desired manner.

The cutter block 13 includes a cutter and a cutter motor for driving the cutter for cutting operations. After the printing is completed, the tape T is stopped when the above-mentioned TF motor further feeds the same by a predetermined number of steps, whereupon the cutter motor is driven to cut off the tape T. It should be noted that the tape printing apparatus 1 is provided with a cut key for enabling the user to manually cut the tape by key stroke, and it is possible to switch between an automatic cutting mode and a manual cutting mode.

The sensor block 14 includes the tape-discriminating sensor and the home position sensor. As described hereinabove, the tape-discriminating sensor discriminates each kind of the tape cartridge 5, each type of tape T, and the print-starting position for starting a printing operation on the printing tape T1 to generate the tape-discriminating signal. The home position sensor detects that the print head 7 has reached the home position and generates the position-detecting signal. These signals are supplied (reported) to the control block 200. It should be noted that in the sensor block 14 can be provided other sensors, such as a voltage sensor which is connected to the power supply unit of the power supply block 290 that supplies power to the components of the tape printing apparatus 1, for detecting changes in the electric potential of the power supply unit, an ambient temperature sensor, a head surface temperature sensor and so forth, or some of them can be omitted to suit the actual requirements of the apparatus.

The driving block 270 includes a display driver, a head driver, and a motor driver. The display driver drives the display 4 of the operating block 11 in response to control signals delivered from the control block 200, i.e. in accordance with commands carried by the signals. Similarly, the head driver drives the print head 7 of the printer block 12 in accordance with commands from the control block 200. Further, the motor driver has a TF motor driver for driving the TF motor of the printer block 12, a CR motor driver for driving the CR motor of the printer block 12, a pump motor driver for driving the pump motor of the printer block 12, and a cutter motor driver for driving the cutter motor of the cutter block 13, and similarly to the display driver and the head driver, drives each motor in accordance with commands from the control block 200.

The operating block 11 includes the keyboard 3 and the display 4. The display 4 has a display screen which is capable of displaying display image data of 96×64 dots on a rectangular display area of approximately 6 cm in the horizontal direction (X-direction)×4 cm in the vertical direction (Y-direction). The display 4 is used by the user when he/she enters data via the keyboard 3 to form or edit matrix data representative of a character string image having characters, such as letters, numerals, symbols, simple figures and the like (hereinafter generically referred to as "characters"), arranged therein and a print image including the character string image, view the resulting data, and enter various commands including ones for selection via the keyboard 3.

On the keyboard 3 there are arranged a character key group 31 including an alphabet key group 311, a symbol key group 312, a number key group 313, and a nonstandard character key group 315 for calling nonstandard characters for selection as well as a function key group 32 for designating various operation modes. In a type of the apparatus which is capable of entering the Japanese language, the character key group 31 also includes a kana key group 314 for entering Japanese hiragana letters and Japanese katakana letters.

The function key group 32 includes a power key 321, a print key 322 for instructing a printing operation, a selection key 323 for finally determining entry of character data and starting a new line during text entry as well as determining selection of one of modes on a selection screen, a color specification key 324 for specifying printing colors including neutral colors (mixed colors) of print image data, a color-setting key 325 for setting character colors and background colors, and four cursor keys 330 (up arrow key 330U, down arrow key 330D, left arrow key 330L, and right arrow key 330R: hereinafter generically referred to as the "cursor key 330") for moving the cursor or the display range of print image data on the display screen in respective upward, downward, leftward, and rightward directions.

The function key group 32 also includes a cancel key 326 for canceling instructions, a shift key 327 for use in changing roles of respective keys as well as modifying registered image data, an image key 328 for alternately switching between a text entry screen or a selection screen and a display screen (image screen) for displaying print image data, a proportion-changing (zoom) 329 key for changing a proportion between the size of print image data and the size of display image data displayed on the image screen, a style key 331 for setting styles of labels to be formed, a file key 332 for handling files, an illustration key 333 for selecting background images, and the cut key 340 for manually cutting the tape T.

Similarly to keyboards of the general type, the above key entries may be made by provision of respective keys or by provision of a smaller number of keys which are permitted to be operated in combination with the shift key 327 or the like. Here, for purposes of ease of understanding, the following description will be made assuming that there are provided as many keys as described above.

As shown in FIG. 1, from the keyboard 3, various commands described above and data are input to the control block 200.

The control block 200 includes a CPU 210, a ROM 220, a character generator ROM (CG-ROM) 230, a RAM 240, an input/output control circuit (IOC) 250, all of which are connected to each other by an internal bus 260.

The ROM 220 has a control program area 221 for storing control programs executed by the CPU 210 as well as a control data area 222 for storing control data including a color conversion table, a character modification table, a dither matrix, a predetermined basic (prescript) dither matrix and the like. In the type of the apparatus which is capable of entering the Japanese language, the control data area 222 also stores a kana-kanji conversion table (dictionary). The CG-ROM 230 stores font data, i.e. data defining characters, symbols, figures and the like, provided for the tape printing apparatus 1. When code data identifying a character or the like is input thereto, it outputs the corresponding font data.

The RAM 240 is backed-up such that stored data can be preserved even when the power is turned off by operating the power key 320. The RAM 240 includes areas of a register group 241 used as flags, a text data area 242 for storing text data of characters or the like entered by the user via the keyboard 3, a display image data area 243 for storing image data displayed on the display screen of the display 4, a print image data area 244 for storing print image data, a registered image data area 245 for storing registered image data, a dither mask area 246 for storing a dither mask being processed or already processed, a color pallet data area 247 for storing color pallet information, such as printing colors or the like, a background image data area 248 for storing background image data as a candidate for a background image and character color data corresponding thereto, buffer areas 249 including a character image-forming buffer (font color buffer), a color conversion buffer, a color-by-color dithered image matrix-arranging buffer, a print buffer, and so forth. The RAM 240 is used as a work area for carrying out the control process.

The IOC 250 incorporates a logic circuit for complementing the functions of the CPU 210 as well as dealing with interface signals for interfacing between the CPU 210 and peripheral circuits. The logic circuit is implemented by a gate array, a custom LSI and the like. The IOC 250 also incorporates the function of a timer for measuring elapsed time. The IOC 250 is connected to the sensors of the sensor block 14 and the keyboard 3, for receiving the signals generated by the sensor block 14 as well as commands and data entered via the keyboard 3, and inputting these to the internal bus 260 directly or after processing them. Further, the IOC 250 cooperates with the CPU 210 to deliver data and control signals input to the internal bus 260 by the CPU 210 or the like, to the driving block 270 directly or after processing them.

The CPU 210 of the control block 200 receives the signals and data from the components of the tape printing apparatus 1 via the IOC 250, according to the control program read from the ROM 220, processes font data from the CG-ROM 230 and various data stored in the RAM 240, and delivers signals and data to the components of the tape printing apparatus 1 via the IOC 250 to thereby carry out position control during printing operations, the display control of the display screen, and the printing control that causes the print head 7 to carry out printing on the tape T under predetermined printing conditions. In short, the CPU 210 controls the overall operation of the tape printing apparatus 1.

Figure 2:
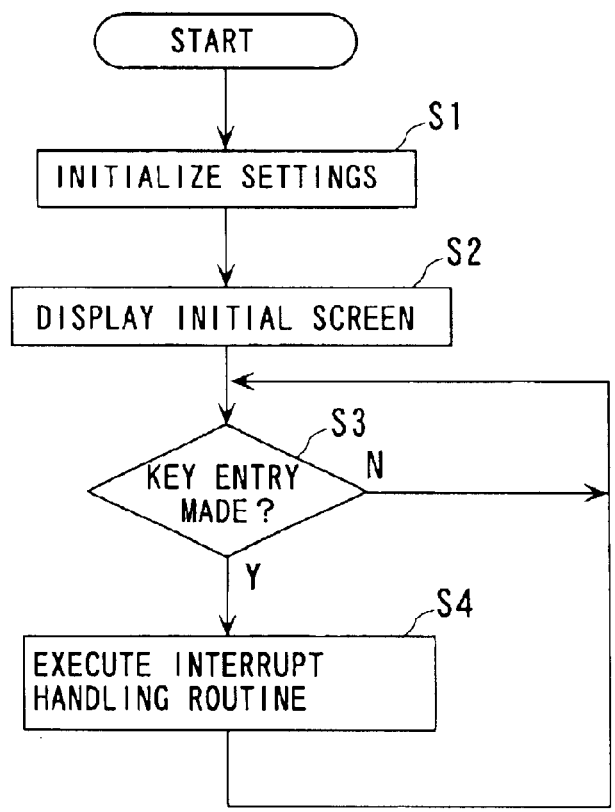
FIG. 2 is a flowchart showing a conceptual representation of an overall control process executed by the FIG. 1 tape printing apparatus.

Next, the overall control process carried out by the tape printing apparatus 1 will be described with reference to FIG. 2. As shown in the figure, when the program for carrying out the control process is started e.g. when the power key 321 is depressed (the power of the tape printing apparatus 1 is turned on), first, at step S1, initialization of the system including restoration of saved control flags is carried out to restore the tape printing apparatus 1 to the state it was in before the power was turned off the last time. Then, the image that was displayed on the display screen before the power was turned off the last time is shown as the initial screen at step S2. The following steps in FIG. 2, that is, step S3 for determining whether or not a key entry has been made and step S4 for carrying out an interrupt handling operation are conceptual representations of actual operations. Actually, when the initial screen has been displayed at step S2, the tape printing apparatus 1 enables an interrupt by key entry (keyboard interrupt), and maintains the key entry wait state (No to S3) until a keyboard interrupt is generated. When the keyboard interrupt is generated (Yes to S3), a corresponding interrupt handling routine is executed at step S4, and after the interrupt handling routine is terminated, the key entry wait state is again enabled and maintained (No to S3).

As described above, in the tape printing apparatus 1, main processing operations by the apparatus are carried out by interrupt handling routines, and hence if print image data for printing is provided or has been prepared, the user can print a print image based on the print image data at a desired time, by depressing the print key 322 to thereby generate an interrupt by the print key and start a printing process. In short, an operating procedure up to the printing operation can be selected by the user as he desires.

Figure 3:
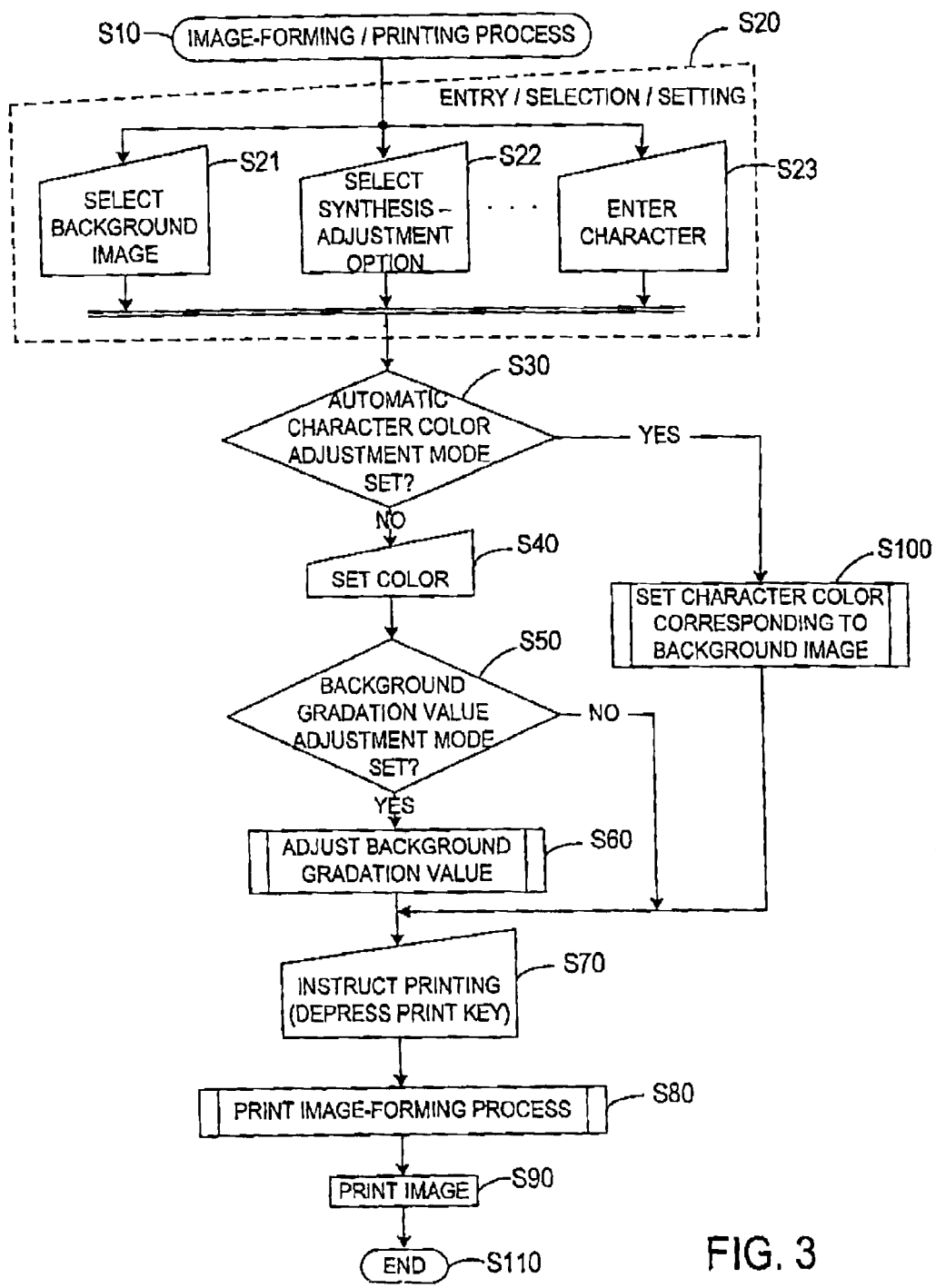
FIG. 3 is a flowchart showing an example of a typical image-forming/printing process executed by the FIG. 1 tape printing apparatus 1.

FIG. 3 is a flowchart showing a typical image-forming/printing process in the tape printing apparatus 1. As shown in the figure, in this process (step S10), first, an entry/selection/setting operation for entering characters, for instance, are carried out at step 20. More specifically, the user enters a character string or a sequence of desired characters via the keyboard 3 at step S21, selects a background image at step S22 or determines at step S23 whether or not synthesis and adjustment of images is carried out (the steps S22 and S23 will be described hereinbelow). The user further selects and sets character sizes or the like at step S20.

Then, it is determined at step S30 whether or not a mode of automatic adjustment of a character color (automatic character color adjustment) is set. If this mode is set (Yes to S30), a character color corresponding to a background image therefor is set at step S100, which will be described hereinafter. Here, let it be assumed that the mode of automatic character color adjustment is not set (No to S30), and next, a character color is set at step S40. Then, it is determined at step S50 whether or not the adjustment of gradation values of the background image (background gradation value adjustment) is set. If this mode is set (Yes to S50), the gradation values of the background image are adjusted at step S60, which will be also described hereinbelow. Now, description is made assuming that this mode of background gradation value adjustment is not set (No to S50). After completion of the above entry operations, a print instruction wait state is enabled and maintained.

Next, when the user depresses the print key 322 to thereby instruct a printing operation at step S70, an interrupt by the print key 322 is generated, as described above, and a print image starts to be formed. After the print image is formed at step S80, the same is printed at step S90, followed by terminating the image-forming/printing process (S10) at step S110.

To output image data represented by matrix data (hereinafter simply referred to as a "matrix") having gradation values representative of e.g. 256 gradation levels assigned to matrix elements thereof, that is, image data (gradation image data) having information of an n-valued gradation value (n=256 in this embodiment) assigned to each pixel, to a tape printing apparatus capable of processing only image data with a smaller (limited) number of gradation values representative of respective gradation levels, it is required to convert the above image data to one (pseudo-gradation image data) adapted to the limited number of gradation values. One of methods used in such image conversion (compression) processing, that is, pseudo-gradation processing is a so-called dither method. It should be noted that, as described herein before, "n-valued gradation value" is intended throughout the specification to mean "gradation value capable of having any one of n possible numerical values", and hence "5-valued gradation value", for instance, is a "gradation value which can have any one of five possible values". Further, "n-valued matrix" is intended throughout the specification to mean "matrix of matrix elements each capable of having any one of n possible numerical values", and hence "5-valued matrix", for instance, is a "matrix of matrix elements which can have any one of five possible values". Typically, the "n possible numerical values" are consecutive n integers starting from 0, i.e. 0 to n−1, expressed in binary data consisting of a plurality of bits.

The dither method is employed to superimpose noise on gradation values of pixels constituting gradation image data of an original image and then carry out binarization (binary dither method) or limited multi-valued conversion (multi-valued dither method) on values resulting from the superimposition. This method takes advantage of the integrating function of human eyes that recognize contents in an area as a shade or a color. In the binary dither method, for instance, the ratio of assignment of two numerical values (e.g. 1's and 0's) to matrix elements of a matrix are changed according to the gradation values of respective pixels of an input gradation image (for instance, by thinning "1's" in the matrix according to the gradation values under a predetermined rule) to thereby represent intermediate gradation (for instance, a gray color represented by setting 1's and 0's to black and white, respectively). A typical binary dither method is a systematic dither method.

In the systematic dither method, first, for comparison with n-valued gradation values each defined by any one of n possible numerical values (n is an integer equal to or larger than 3) and assigned to pixels forming an original gradation image, a dither matrix of thresholds each defined by any one of m possible numerical values (m is an integer satisfying a condition of n≧m≧2) and arranged therein as matrix elements is prepared beforehand. Next, (the matrix of) the original gradation image is divided into matrices each having the size of the dither matrix, and the gradation values of the respective elements of each of the divisional matrices and the corresponding thresholds of the dither matrix are compared with each other on an element-by-element basis to determine whether or not a gradation value satisfies a condition designated by a corresponding threshold. According to results of the determination, either of the numerical values 1 and 0 is assigned to each pixel to thereby form a pseudo-gradation image represented by a binary matrix. For instance, if the gradation value of a matrix element satisfies a condition designated by a corresponding threshold, a numerical value (e.g. 1) indicating validity of the gradation value is assigned to a corresponding matrix element, whereas if the gradation value does not satisfy the condition, a numerical value (e.g. 0) indicating invalidity of the gradation value is assigned to the corresponding matrix element, whereby a pseudo-gradation image represented by a two-valued (binary) matrix (i.e. of matrix elements each having a value 1 or 0) is formed.

By definition of relationship between gradation values and thresholds therefor, the gradation value of each matrix element which is equal to or larger than a corresponding threshold, larger than the threshold, equal to or smaller than the same, or smaller than the same, for instance, can be a gradation value satisfying a condition designated by the corresponding threshold. Now, the dither method will be described, by way of example, based on a case in which a gradation value equal to or larger than a corresponding threshold (gradation value≧threshold) satisfies the condition designated by the threshold. Of course, even when the condition of a gradation value satisfying a corresponding threshold is differently defined, pseudo-gradation processing can be carried out based on the same principle as described above. Further, in the present embodiment, the above-mentioned systematic dither method is used as the binary dither method, and pseudo-gradation processing by the binary dither method (binary dither process) is carried out.

The multi-valued dither method is a dither method in which, a converted (compressed) image, that is, a pseudo-gradation image is not an image represented by a binary matrix (binary image) but an image represented by a multi-gradation matrix of matrix elements having three or more gradation values (multi-valued image). However, the image can be processed by this method in a manner similar to processing by the binary dither method. For instance, when a gradation image with 256 gradation values ranging from 0 to 255 is processed, the 256 gradation values are classified into e.g. four ranges of gradation values, that is, range 1 from 0 to 64, range 2 from 64 to 128, range 3 from 128 to 192 and range 4 from 192 to 255, and dither matrices corresponding to respective ranges of gradation values are provided for application of the systematic dither method to the gradation image. Further, two values representative of results of the application of the systematic dither method to range 1 are defined as 0 and 1, two values representative of results of the application of the systematic dither method to range 2 as 1 and 2, two values representative of results of the application of the systematic dither method to range 3 as 2 and 3, and two values representative of results of the application of the systematic dither method to range 4 as 3 and 4. Then, when the systematic dither method is carried out for each range of gradation values, a 5-valued pseudo-gradation image represented by five gradation values of 0 to 4 can be formed. Of course, if the binary dither method is further carried out on such a multi-valued (e.g. 5-valued) pseudo-gradation image, it is also possible to finally obtain a two-valued or binary pseudo-gradation image.

The above pseudo-gradation processing by the dither method (hereinafter referred to as "dithering") can be applied not only to a monochrome image (gradation image having gradation values of gray tones) but also to a color image. That is, dithering (color dithering) is carried out on gradation values of each of basic colors, such as three primary colors, thereby making it possible to obtain a pseudo-gradation image (hereinafter, a pseudo-gradation image obtained by dithering is referred to as a "dithered image"). In this case, for instance, to form a dithered (pseudo-gradation) image as a display image to be output a to a display or the like, it is only required to carry out dithering on gradation values of each of three primary colors, i.e. R (red), G (green) and B (blue), separately, whereas to form a dithered (pseudo-gradation) image as a print image for printing, it is only required to carry out dithering on gradation values of each of three primary colors, i.e. C (cyan), M (magenta) and Y (yellow), separately. In the latter case, alternatively, dithering of gradation values of each of four basic colors, i.e. C, M, Y plus K (black) may be separately performed.

In the tape printing apparatus 1, not only a monochrome image but also a color image can be treated as a main image, a background image, and a synthesized image formed by synthesizing the main image and the background image, so that in the following, a case in which a color image is dealt with will be described. In this case, to obtain a dithered color image, it is only required that the above dithering is carried out on gradation values of each of the three primary colors R, G, B or C, M, Y, or alternatively, each of the four basic colors C, M, Y and K, and then, the resulting dithered images for respective colors are combined. In the tape printing apparatus 1, however, display images to be output to the display 4 are newly formed and displayed, whenever characters and the like are entered, whereas print images are created after printing is instructed (the print key 322 is depressed). In the following, a print image-forming process will be mainly described. Further, although in this case, a dithered image for each of the four basic colors C, M, Y and K can be directly obtained, in the present embodiment, after dithered images for the respective colors C, M, and Y are obtained, pixels (matrix elements) having a validity-indicative value commonly among the dithered images are extracted, whereby a dithered image for a color K is obtained. First, description is made of a basic process for forming a print image when a main image is not synthesized with a background image, that is, when an option of no background image, will be described hereinafter with reference to FIG. 21.

It should be noted that in the following, for convenience of representations of figures and explanation thereof (for efficiency of description) as well as for purposes of ease of understanding, description is made based on five gradation values 0 to 4 (n=5) and by using a 2 times 2 matrix as a dither matrix. Of course, a gradation image with 64 or 256 gradation levels described above can be processed based on the same principle. Further, the 4 times 4 matrix and 8 times 8 matrix can be employed as a dither matrix. Furthermore, in the following, the dither matrix DD5 (see FIG. 6A and FIG. 8A: the same dither matrix) is employed as the 2 times 2 dither matrix for the same reason. Although in such a case, $2^k$ gradation values 0 to ($2^k-1$) (k is a natural number equal to or larger than 2), such as 64 gradation values 0 to 63, and 256 gradation values 0 to 255 are normally used for efficiency of binary digital information, in the following, five gradation values 0 to 4 are employed with preference to ease and clarity of explanation.

As described hereinabove, since the tape printing apparatus 1 is a printing apparatus of an ink jet type, a matrix element having a validity-indicative value "1" of a dithered image formed as a print image, corresponds to a pixel for which an ink droplet should be ejected from the print head (ink jet head) 7 to a tape T (especially, printing tape T1: printing object). Further, as described hereinbefore, the three primary colors are set to C (cyan), M (magenta) and Y (yellow). Colors are represented by a so-called subtraction color-mixing method which is suitable for representing colors by using reflection when printing is effected by using an XY plotter, a printer or the like. Further, the four colors C, M, Y, and K (black) which is a mixture of the three primary colors C, M, and Y, are defined as the basic colors.

Referring to FIG. 3, the user enters characters and the like, such as a character string "123", via the keyboard 3 at step S20 and then, sets colors of the characters at step S40, while confirming or viewing results of the entry and setting operations on the display 4. In this case, when printing colors are specified, the color specification key 324 is operated, whereby the gradation values of C (cyan), M (magenta) and Y (yellow) are designated on the display screen of the display 4, based on color information (hereinafter referred to as "color pallet information") defined in a color conversion table shown in FIG. 7, for instance. Then, colors of the characters are designated by operating the color-setting key 325 for setting the same. As shown in FIGS. 6B and 6C (see FIG. 7 as well), for instance, black (No. 1 in the FIG. 7 table) is specified for the character image (main image) of the character "1". That is, the gradation values of C, M, and Y are all set to "4".

Further, light amaranth (No. 19 in the same table) is specified for the character image of the character "2". That is, "0", "2", and "1" are designated, as the designated gradation values (hereinafter referred to as "primary color gradation values") of the three primary colors C, M, and Y, respectively. Similarly, light yellow (No. 17 in the table) is specified for the character image of the character "3". That is, "0", "0", and "2" are designated as the primary color gradation values of C, M, and Y, respectively. The data (color pallet data) CP1, CP2 and CP3 of the above color pallet information is stored in the color pallet data area 247 of the RAM 240 as gradation values designated for the character images (main images) of the characters "1", "2" and "3".

Figure 4:
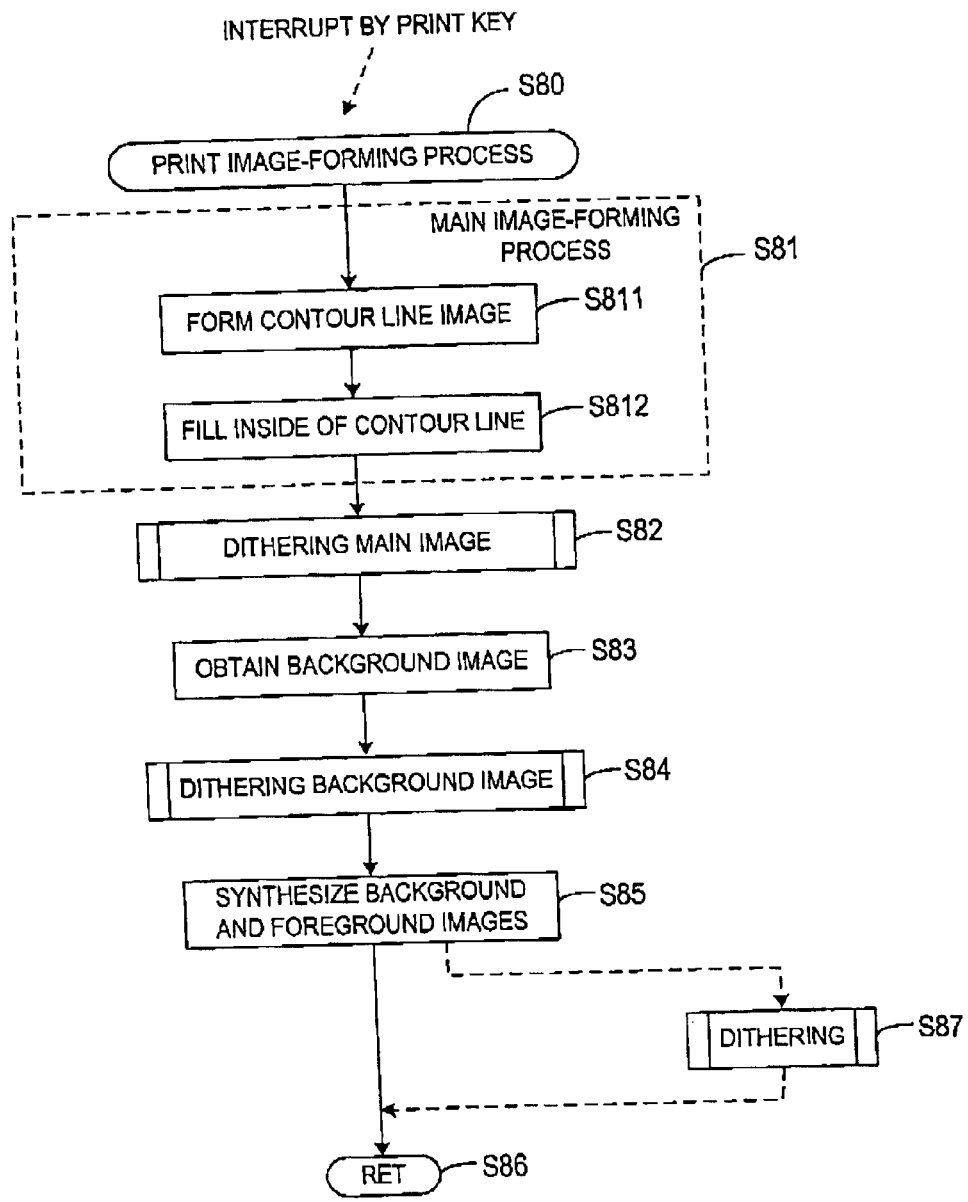
FIG. 4 is a flowchart showing an example of a print image-forming process in FIG. 3.

Referring to FIG. 3, when printing is instructed by operating the print key 322 (S70), an interrupt by the print key 322 is generated, and the print image-forming process is started at step S80. As shown in FIG. 4, an image of each character of the character string "123" is formed based on an outline font stored in the CD-ROM 230 to form main shape image data items SG1, SG2, and SG3 representing main shape images of the respective characters (image elements) appearing in FIG. 6B at step S81. Of course, in addition to images of characters thus formed based on the outline font, it is also possible to use images of characters formed based on a dot map font, or images of characters registered as dot maps by nonstandard character registration or depicted image registration, for instance. These images of characters (i.e. data thereof) are loaded into the character image-forming buffer (font color buffer) described above.

Although in this case, main image data representative of a main image can be comprised of image data items (matrices) each formed of matrix elements each having a gradation value corresponding to each pixel (see image data IMG(Y) for color Y in FIG. 6D for instance: in this case, it is required to provide image data of this kind for each of the four colors C, M, Y and K), in the tape printing apparatus 1 of the present embodiment, since all valid pixels of a main image are set to have a common set of gradation values (n-valued main image gradation values), the main image data is configured to be comprised of separate items of data: two-valued matrix indicating only the validity or the invalidity of each pixel of the main image (e.g. main shape image data SG1 in FIG. 6B) and numerical value data indicating the gradation values (main image gradation values) common to the valid pixels (e.g. color pallet data CP1 in FIG. 6C), whereby the capacity of the memory device is saved. Further, as described hereinbelow, when a background image can be divided into one or more image elements (however complicated an image is, basically, it can be divided) having respective identical sets of gradation values set to all the valid pixels thereof, background image data representing the background image of each image element is configured to be comprised of two separate items of data: numerical value data (e.g. color pallet data) indicating gradation values (background gradation values) and two-valued matrix (background shape image data, described hereinafter) indicating only the validity or the invalidity of each pixel of the image element, whereby the capacity of the memory device is saved.

As described above, in the tape printing apparatus 1, text data for forming a main image is entered, and main shape image data representing a main shape image is produced from the text data based on predetermined font data. More specifically, main shape image data is formed such that a validity-indicative one of predetermined validity-indicative and invalidity-indicative values is assigned to each pixel of the main shape image forming the shape of the main image, while the invalidity-indicative value is assigned to each pixel of an image other than the main shape image. Here, out of all the pixels of the main image, all the pixels of the main shape image are treated as all the valid pixels of the main image. That is, by entry of text data via the keyboard 3, for instance, main shape image data which represents a main shape image forming the shape of a main image can be produced with ease from the text data by using the predetermined font.

Since the outline font is defined by coordinates of the contour line and attributes thereof, as shown in FIG. 4, the process of forming an image based on the outline font is generally executed by carrying out a contour-plotting process (contour line image-forming process (S811), the process of assigning a validity-indicative one (valid value) of the validity-indicative and invalidity-indicative values to matrix elements forming the contour line), and a so-called filling process (process of filling the inside of a contour line (S812): process of assigning the valid value to all the matrix elements inside the contour line for filling the inside of the contour line plotted). As a result, according to the tape printing apparatus 1, main shape image data in which all the matrix elements corresponding to all the pixels inside the contour line of a main image indicate a valid value can be created by a general image-forming method carried out based on the outline font.

As described hereinabove, main image data can be formed of two-valued matrix (main shape image data) indicating only the validity or the invalidity of each pixel of a main image and numerical value data (color pallet data) indicating the gradation values (main image gradation values) (of the color) of valid pixels. According to the tape printing apparatus 1, the two-valued matrix (main shape image data) can be easily produced based on an outline font, and hence if the main image gradation values are correlated to each valid pixel, it is possible to easily form main image data representing the main image (by providing the color pallet data indicating the main image gradation values). That is, since two-valued matrix (main shape image data) indicating only the validity or the invalidity of each pixel of a main image can be easily formed, main image data can be produced with ease.

In general, a color or color tone of each pixel of a color image can be represented by decomposing the color into primary color gradation values of the three primary colors. In the tape printing apparatus 1, a main image is a color image, and hence, the main image gradation values of the color image include the gradation values of the three primary colors. The setting of the main image gradation values is the setting of the color of the main image (S40) as described above with reference to FIG. 3. Hence, the gradation values of the main image can be set with ease by decomposing the selected or set color into the primary color gradation values of the three primary colors C, M, and Y, whereby main image data representing the main image can be easily formed.

Referring to FIG. 4, after the main shape image of each character (each image element) is produced to terminate the main image-forming process (S81), dithering is carried out on the main images formed to thereby create dithered main images (dithered main image DGY for color Y in FIG. 8C, for instance: in this case, it is required to provide image data of this kind for each of the four colors C, M, Y and K) at step S82. Then, a background image is obtained at step S83, and dithering on the background image and image synthesis are carried out at steps S84 and S85, respectively, followed by terminating the print image-forming process at step S86. However, as described above, here, the option of no background image is selected (all the matrix elements of the background image set to the invalid value), so that a result of the synthesis is identical to the dithered main image itself (for instance, the FIG. 8C dithered main image DGY for color Y).

Next, the dithering (S82, S84) is described. In the tape printing apparatus 1, a dither mask is stored which is represented by a two-valued (binary) matrix having a size identical to a dither matrix. More specifically, as the dither mask, there is stored a matrix in which a validity-indicative one of two predetermined numerical values is assigned to each matrix element corresponding to each threshold of the dither matrix whose condition is satisfied by a designated gradation value, whereas an invalidity-indicative one of the two predetermined numerical values is assigned to each matrix element corresponding to each threshold of the dither matrix whose condition is not satisfied by the designated gradation value.

Figures 8A, 8B, 8C, 8D:
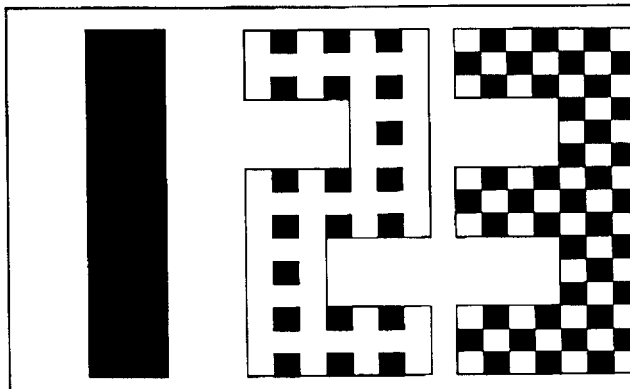
FIG. 8A is a diagram illustrating an example of dither matrix, which is identical to the FIG. 6A dither matrix.
FIG. 8B is a diagram illustrating examples of dither mask data.
FIG. 8C is a diagram illustrating an example of dithered main image data for color Y of a color image corresponding to FIG. 6D.
FIG. 8D is a diagram illustrating an example of a print image corresponding to the dithered main image data for color Y of the color image corresponding to FIG. 6D.

More specifically, in the above examples illustrated in FIGS. 6A to 6D, as shown in FIG. 8A, five dither masks DM5(0) to DM5(4) are formed in advance for storage. The dither masks DM5(0) to DM5(4) in this case coincide with the matrices of pseudo-gradation images obtained by carrying out the binary dither process on predetermined gradation images each having the same size (2 times 2 in these examples) as that of the dither matrix DD5 and having respective designated gradation values "0" to "4", using the dither matrix DD5 (the pseudo-gradation images produced by setting "1" to black and "0" to white are shown in parentheses under the respective dither masks DM5(0) to DM5(4)). The parenthesized number of the suffix h (=0 to 4) of the dither mask 5(h) coincides with a corresponding designated gradation value, and represents each type of the dither mask. Hence in the following description, this number is referred to as the "mask number").

For instance, when a 2 times 2 gradation image has information of an n-valued gradation value (n=5 in this example) for each pixel, and at the same time this gradation value information for each pixel indicates e.g. the designated gradation value "0", if the gradation value "0" for each pixel of the gradation image is compared with each threshold of the dither matrix DD5, none of the gradation values of the gradation image (i.e. matrix thereof) satisfy the condition (gradation value<threshold). Hence, the values of all the elements of the 2 times 2 matrix of the gradation image are set to "0". That is, the dither mask DM5(0) in FIG. 8B coincides with a matrix resulting from the comparing operation carried out. Similarly, when the binary dither process is carried out on a 2 times 2 gradation image whose pixels all have the same designated gradation value of "1" by using the dither matrix DD5, an element of the matrix of the gradation image satisfying the condition (gradation value 2 threshold) is one at a lower right location thereof, that is, a matrix element of the resulting matrix which is set to "1" is at a lower right location. That is, the dither mask DM5(1) shown in FIG. 8B coincides with the matrix obtained by the comparing operation. Similarly, the dither mask DM5(2) coincides with a matrix obtained by carrying out the binary dither process on a 2 times 2 gradation image whose pixels all have the same designated gradation value "2" by using the dither matrix DD5. The dither mask DM5(3) coincides with a matrix obtained by carrying out the binary dither process on a 2 times 2 gradation image whose pixels all have the same designated gradation value "3", and the dither mask DM5(4) coincides with a matrix obtained by carrying out the binary dither process on a 2 times 2 gradation image whose pixels all have the same designated gradation value "4".

In the above case, since the dither masks DM5(0) to DM5(4) are stored in advance for respective possible designated gradation values 0 to 4, it is only required to read out one of them when it is used. This makes it possible to omit computing time to thereby shorten time required for the whole image processing operation. Of course, as described above, a dither mask may be newly produced for storage by carrying out comparison between a designated gradation value and each threshold of the dither matrix DDS, after the designated gradation value is determined. In this case, the capacity of the memory device for storing the dither masks can be saved. In addition, the comparing operation is carried out between matrices having the size (2 times 2, in this example) of the dither matrix DD5, which permits processing time for the comparison to be made relatively short.

By using the dither masks, a logical AND operation is performed between each matrix element of each of matrices of respective portions of a main (elementary) shape image, which matrices each have the same size as that of the dither mask, and a corresponding one (corresponding in matrix element location) of the matrix elements of the dither mask, such that the validity-indicative value is output only when both a matrix element of each of the matrices of the respective portions of the main shape image and a corresponding matrix element of the dither mask have the validity-indicative value. As a result of the logical AND operations, there is produced a dithered main image (element) represented by a predetermined binary matrix having a size identical to that of the main shape image.

For instance, in the case of the above example, when a logical AND operation is performed between each matrix element of a 2 times 2 matrix of each of portions of the main shape image data SG1 representative of the corresponding main shape image and a corresponding one (corresponding in matrix element location) of the matrix elements of the dither mask DM5(4) having the designated gradation value "4", the dithered main image data representative of the resulting dithered main image is an 8 (horizontal) times 17 (vertical) matrix (representative of the character "1") at a left side portion of the FIG. 8C dithered image data (hereinafter referred to as "whole dithered image data") which represents a dithered image (hereinafter referred to as a "whole dithered image") of the character string image (whole image) of the character string "123". That is, there is obtained the left side portion (8×17 matrix) of the FIG. 8C whole dithered image data DGY of 24 (horizontal) times 17 (vertical) matrix elements.

Similarly, when a logical AND operation is carried out between each matrix element of a 2 times 2 matrix of each of portions of the main shape image data SG2 representative of the corresponding main shape image and a corresponding one of the matrix elements of the dither mask DM5(1) having the designated gradation value "1", a dithered main image data of 8 (horizontal) times 17 (vertical) (representing the character "2") at a center of the 24 (horizontal) times 17 (vertical) whole dithered image data item DGY in FIG. 8C is obtained. Further, when a logical AND operation is carried out between each matrix element of a 2 times 2 matrix of each of portions of the main shape image data SG3 representative of the corresponding main shape image and a corresponding one of the matrix elements of the dither mask DM5(2) having the designated gradation value "2", a dithered main image data of 8 (horizontal) times 17 (vertical) (representing the character "3") at a right side portion of the 24 (horizontal) times 17 (vertical) whole dithered image data DGY in FIG. 8C is obtained. In other words, it is only required to perform the logical AND operation, which is simple, whereby it is possible to enhance processing speed (shorten processing time) of the apparatus. Moreover, since the inputs (the dither mask and the main shape image data) and the output (dithered main image) of the logical AND operation are represented by binary matrices, the capacity of the memory device can be saved.

Figure 5:
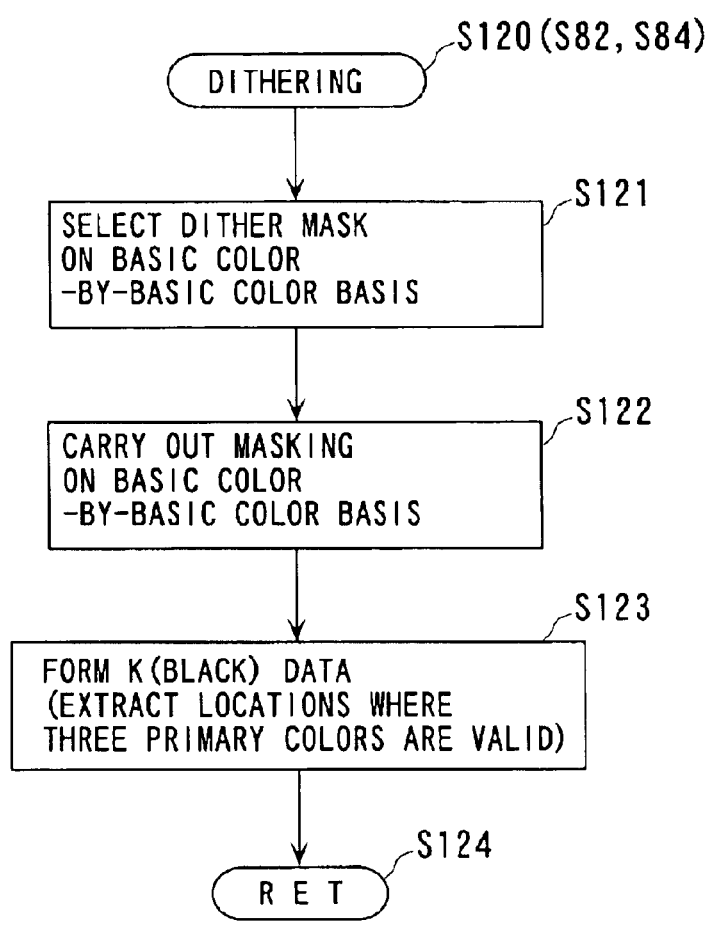
FIG. 5 is a flowchart showing an example of dithering executed in the FIG. 4 print image-forming process.

Although in the above description, only the processing carried out on image data of color Y was taken as an example, the same processing is carried out on image data of colors C and M. As shown in FIG. 5, when dithering (S120: a step used (started) at the FIG. 4 step S82 or S84) is carried out, first, a dither mask for use with each basic color is selected at step S121. For instance, when attention is paid to the character image (main shape image) of the character "1", the primary color gradation values of colors C, M, and Y are all equal to "4", and hence if the dither mask DM5(4) having mask number "4" is available, the program can proceed to a next step S122 for carrying out a masking process. Although in the tape printing apparatus 1, possible designated gradation values (primary color gradation values, in this example) are all created for storage beforehand, as described above, if only the character image (main shape image) of the character "1" is to be processed, it is only required to store the dither mask DM5(4) alone as a dither mask. Similarly, when attention is paid to the character image (main shape image) of the character "2", the primary color gradation value of color C is "0", that of color M is "2", and that of color Y is "1", so that if the dither masks DM5(0), DM5(2), and DM5(1) having respective mask numbers "0", "2", and "1" are available, the program can proceed to the next masking process (S122). Similarly, when attention is paid to the character image (main shape image) of the character "3", the primary color gradation value of color C is "0", that of color M is "0", and that of color Y is "2", so that if the dither masks DM5(0) and DM5(2) having respective mask numbers "0" and "2" are available, the program can proceed to the next masking process (S122).

Referring again to FIG. 5, after dither masks for use with each corresponding basic color have been selected (S121), the masking process is carried out on basic color-by-basic color basis at step S122. More specifically, a logical AND operation is performed between each matrix element of each of matrices of respective portions of each main shape image, which matrices (formed by dividing the main shape image data) each have the same size as that of each dither mask, and a corresponding one of the matrix elements of the dither mask, such that the validity-indicative value is output only when both a matrix element of each of the matrices of the respective portions of the main shape image and a corresponding matrix element of the dither mask have the validity-indicative value. As a result of the logical AND operation, there is produced a dithered main image represented by a predetermined binary matrix (dithered main image data) having a size identical to that of (the main shape image data representative of) the main shape image.

Figure 9A:
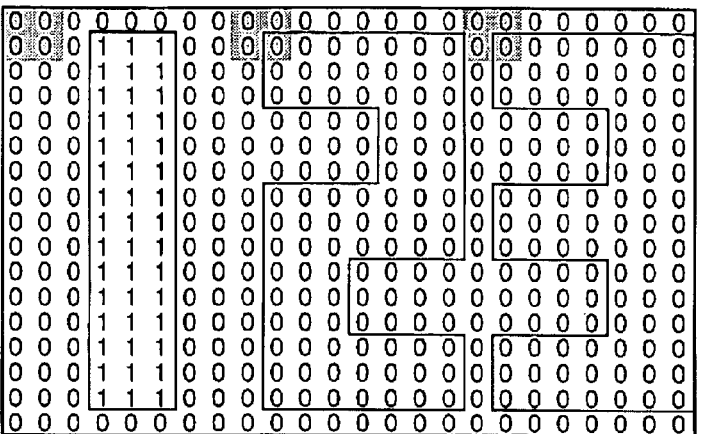
FIG. 9A is a diagram illustrating an example of dithered main image data for color C of the color image corresponding to FIG. 6D.
Figure 9B:
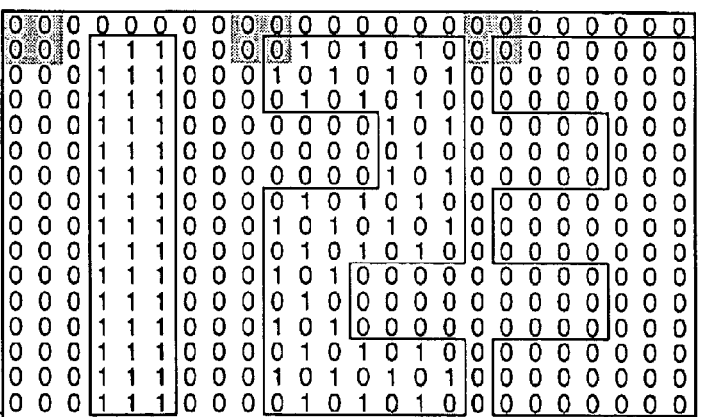
FIG. 9B is a diagram illustrating an example of dithered main image data for color M of the color image corresponding to FIG. 6D.

For instance, when attention is paid to the character image (main shape image) of the character "1", the primary color gradation values of colors C, M, and Y are all equal to "4", and hence when the logical AND operation is performed between each matrix element of a 2 times 2 matrix of each of portions of the main shape image data SG1 representative of the corresponding main shape image and a corresponding one of the matrix elements of the dither mask DM5 (4) provided for the primary color gradation value (designated gradation value) "4", the dithered main image data representative of the resulting dithered main image is an 8 (horizontal) times 17 (vertical) dithered main image data (hereinafter, dithered main image data of a primary color is referred to as "primary color dithered main image data") which represents the character "1" and forms each left side portion of items of whole dithered image data (hereinafter, the whole dithered image data for use with each corresponding primary color is referred to as "primary color whole dithered image data") shown in FIGS. 8C, 9A and 9B, each representing the whole dithered image of the whole character string image "123" with respect to each corresponding color, that is, the left side portion of each of 24 (horizontal) times 17 (vertical) primary color whole dithered image data items DGY, DGC, and DGM, shown in the above figures.

Similarly, when a logical AND operation is performed between each matrix element of a 2 times 2 matrix of each of portions of the main shape image data SG2 representative of the corresponding main shape image and a corresponding one of the matrix elements of the dither mask DM5(1) used for the primary color gradation value (designated gradation value) "1" of color Y, an 8 (horizontal) times 17 (vertical) primary color dithered main image data which represents the character "2" and forms a central portion of the primary color whole dithered image data DGY in FIG. 8C is obtained. When a logical AND operation is performed between each matrix element of a 2 times 2 matrix of each of portions of the main shape image data SG2 representative of the corresponding main shape image and a corresponding one of the matrix elements of the dither mask DM5(0) used for the primary color gradation value (designated gradation value) "0" of color C, an 8 (horizontal) times 17 (vertical) primary color dithered main image data which represents the character "2" and forms a central portion of the primary color whole dithered image data DGC in FIG. 9A is obtained. When a logical AND operation is performed between each matrix element of a 2 times 2 matrix of each of portions of the main shape image data SG2 representative of the corresponding main shape image and a corresponding one of the matrix elements of the dither mask DM5 (2) used for the primary color gradation value (designated gradation value) "2" of color M, an 8 (horizontal) times 17 (vertical) primary color dithered main image data which represents the character "2" and forms a central portion of the primary color whole dithered image data DGM in FIG. 9B is obtained.

Similarly, attention is paid to the character image (main shape image) of the character "3". When a logical AND operation is performed between each matrix element of a 2 times 2 matrix of each of portions of the main shape image data SG3 representative of the corresponding main shape image and a corresponding one of the matrix elements of the dither mask DM5(2) used for the primary color gradation value (designated gradation value) "2" of color Y, an 8 (horizontal) times 17 (vertical) primary color dithered main image data which represents the character "3" and forms a right side portion of the primary color whole dithered image data DGY in FIG. 8C is obtained. When a logical AND operation is performed between each matrix element of a 2 times 2 matrix of each of portions of the main shape image data SG3 representative of the main shape image and a corresponding one of the matrix elements of the dither mask DM5(0) used for the primary color gradation value (designated gradation value)"0" of colors C and M, 8 (horizontal) times 17 (vertical) primary color dithered main image data items which each represent the character "3" and form respective right side portions of the primary color whole dithered image data items DGC and DGM shown in FIGS. 9A and 9B are obtained.

Figure 10A:
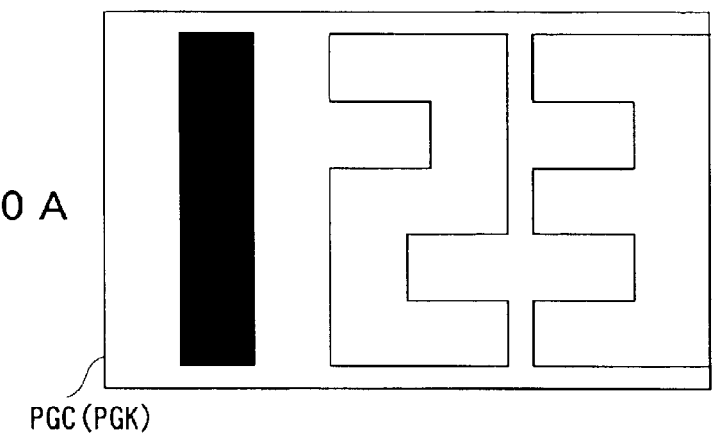
FIGS. 10A and 10B are diagrams illustrating examples of print images corresponding to FIGS. 9A and 9B, respectively.
Figure 10B:
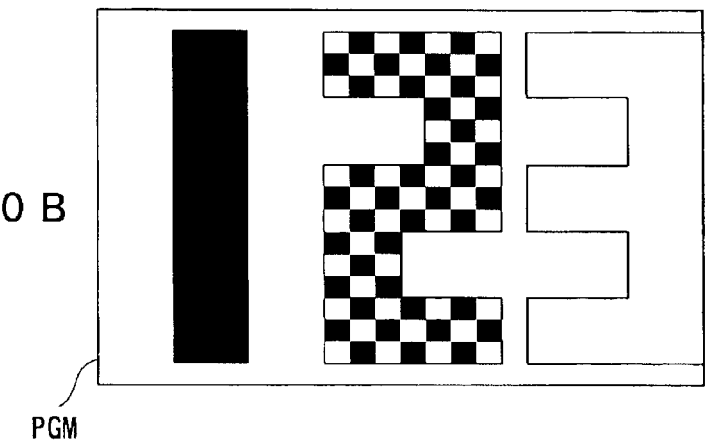

The primary color whole dithered image data items DGY, DGC and DGM shown in FIGS. 8C, 9A and 9B are produced by arranging primary color dithered main image data of each character in a corresponding one of color-by-color dithered image matrix-arranging buffers provided, respectively, for the basic colors Y, C and M. Further, as shown in FIG. 5, after the color-by-color masking process (S122) has been completed, a K (black) data-forming process is carried out at step S123. The CMY color printing can be also carried out by carrying out the FIG. 4 print image-forming process (S80) while omitting this step (S123) and effecting a color-by-color ink delivery process for printing print images formed (S90 in FIG. 3). The resulting print images printed in colors Y, C and M are indicated by print images (pseudo-gradation images) PGY. PGC and PGM, shown in FIGS. 8D, 10A and 10B, respectively. Contour lines of the characters "2"and "3", are drawn for purposes of ease of understanding, but not printed in actual print images.

In the above case, as to the character "1", (the matrix of) a primary color dithered main image thereof may be formed in the work area by using the dither mask DM5(4) and copied to the three color-by-color dithered image matrix-arranging buffers for colors Y. C and M for storage therein. Similarly, as to the character "3", (the matrix of) a primary color dithered main image thereof may be created by using the dither mask DM5(2) and (the matrix of) a primary color dithered main image thereof may be created by using the dither mask DM5(0), with the latter being copied in duplicate to the color-by-color dithered image matrix-arranging buffers for colors C and M.

As shown in FIG. 5, after the color-by-color masking process (S122) has been completed, the k (black) data-forming process (process of extracting points i.e. locations where three colors are valid (ON) at the same time) is carried out at step S123. According to the tape printing apparatus 1, in the K data-forming process (S123), first, a mixed color dithered main image is created as a new type of dithered main image. More specifically, in the tape printing apparatus 1, when the main image is a color image, locations of corresponding matrix elements of the matrices of all primary color dithered main images, which commonly have the validity-indicative value, are extracted and then, the validity-indicative value is assigned only to matrix elements at corresponding locations of a matrix to form a mixed color dithered main image as the new type of dithered main image. In this case, it is possible to obtain not only primary color dithered main images for the three primary colors but also a mixed color dithered main image for a mixture of the three primary colors. This mixed color dithered main image is produced, for instance, as a result of a logical AND operation which is performed between corresponding matrix elements of the formed primary color dithered main images, such that the validity-indicative value is output only when all the corresponding matrix elements have the validity-indicative value. In short, the mixed color dithered main image can be created simply by carrying out the logical AND operation, which is relatively simple operation.

In the case of the above example, as clearly shown by color pallet data CP2 and CP3 appearing in FIG. 6C, the primary color gradation values (corresponding to mask numbers, in this example) of the character images of the letters "2" and "3" include "0's", so that a logical AND operation is performed between each matrix element of each of matrices of respective portions of the main shape image and a corresponding one of the matrix elements of the FIG. 6D dither mask DM5(0) used for the primary color gradation values, whereby the characters "2" and "3" are determined to have primary color dithered main image data in which all the matrix elements thereof have the invalidity-indicative value "0" (portions of the characters "2" and "3" in FIG. 9A, and a portion of the character "3" in FIG. 9B), and hence there are no matrix elements corresponding between all the primary color dithered main images and commonly having the validity-indicative value "1". On the other hand, as shown by the FIG. 6C color pallet data CP1 and the primary color dithered main images in FIGS. 8C and 9A to 9B, as to the character "1" whose color is specified as black, all the matrix elements of portions corresponding to main images of the primary color dithered main image data of the respective colors C, M, and Y have the validity-indicative value "1". Accordingly, a mixed color dithered main image formed by extracting matrix elements which correspond between all the primary color dithered main images and each commonly have the validity-indicative value "1" coincides with a main shape image of the character "1". That is, the mixed color dithered main image is obtained which is represented by dithered main image data (hereinafter, dithered main image data of a mixed color is referred to as "mixed color dithered main image data") having the same values as those of the FIG. 6B main shape image data SG1.

Similarly to the case of the primary color whole dithered image data which is formed by arranging primary color dithered main image data, mixed color dithered main image data of each character is arranged in a color-by-color dithered image matrix-arranging buffer provided for color K whereby a mixed color whole dithered image is obtained which is represented by whole dithered image data of a mixed color (color K in this example) (hereinafter whole dithered image data of a mixed color is referred to as "mixed color whole dithered image data). In the case of the above example, mixed color whole dithered image data DGK and a print image (pseudo-gradation image) PGK created by printing the data DGK as it is become identical to the FIG. 9A primary color whole dithered image data DGC and the FIG. 10A print image PGC, for color C.

Although in the case of the above example, black, that is, color K itself is a designated color, this is not limitative, but as shown in FIG. 7, not only for K (black) (see the column of "K" designated by No. 1) but also for shades of gray (achromatic color) (see the column of "K" at No. 3 to No. 5) and chromatic colors changed in brightness (see the column of "K" at No. 24 and No. 25), locations of matrix elements corresponding between all primary color dithered main images formed and commonly having the validity-indicative value "1" can be extracted and then, by assigning the validity-indicative value "1" only to matrix elements of a matrix at locations corresponding respectively to the extracted locations, a mixed color dithered main image can be obtained. By applying this process to a whole image, a mixed color whole dithered image can be obtained.

In the above example, since K is designated, mixed color dithered main image data of the character "1" comes to be the same as dithered main image data formed by using the mask number "4", that is, comes to have the same values as those of the main shape image data SG1 (see the column of "K" at No. 1). However, if gray (see the column of "K" at No. 4: the mask number "2") is designated, for instance, matrix elements corresponding between all primary color dithered main images and commonly having the validity-indicative value "1" coincide with matrix elements having the validity-indicative value "1" of dithered main image data obtained by carrying out a logical AND operation between each matrix element of a 2 times 2 matrix of each of portions of the main shape image data SG1 representative of the corresponding main shape image and a corresponding one of the matrix elements of the dither mask DM5(2) used for mask number "2". That is, the mixed color dithered main image in this case is identical to a dithered main image formed based on the main shape image by using the dither mask 5(2) of the mask number "2".

In the FIG. 5K data-forming process (S123), after the above mixed color dithered main image has been produced, a mixed color valid matrix element-deleting process described below is carried out. Further, after the K (black) data-forming process (S123) has been terminated, the dithering (S120, i.e. step S82 in FIG. 4) is terminated at step S124. As shown in FIG. 4, if there is a background image to be added, the background image is read in at step S83 to carry out the same dithering (S84), and the dithered background image is synthesized with the dithered main image at step S85, followed by terminating the print image-forming process (S80) at step S86. Referring to FIG. 3, then, (the matrix of) each whole dithered image arranged in each color-by-color dithered image matrix-arranging buffer is transferred to a print buffer, and ink droplets are ejected color by color, whereby a print image formed as a pseudo-gradation (dithered) image is printed at step S90, followed by terminating the image-forming/printing process (S10) at step S110. Although in the above description, for purposes of ease of understanding, each whole dithered image is first arranged in each color-by-color dithered image matrix-arranging buffer for forming the same, and then transferred to the print buffer, this is not limitative, but the whole dithered image may be directly arranged in a color-by-color arranging area in the print buffer.

As described hereinabove, in the tape printing apparatus 1, the mixed color valid matrix element-deleting process is carried out in the K (black) data-forming process in FIG. 5 (S123). More specifically, in the mixed color valid matrix element-deleting process out of matrix elements of each of the primary color dithered main images formed, having the validity-indicative value "1", each matrix element corresponding to each matrix element of the mixed color dither mask, having the validity-indicative value "1", has its validity-indicative value converted to the invalidity-indicative value "0". By carrying out this deleting process, out of matrix elements of each of the primary color dithered main images for the three primary colors, having the validity-indicative value "1", each matrix element corresponding in matrix element location to each matrix element of the mixed color dithered main image, redundantly having the validity-indicative value "1", has its validity-indicative value canceled.

Assuming that primary color dithered main images for the three primary colors and a mixed color dithered main image for a mixed color of the primary colors are combined with each other (superimposed one upon the other), a matrix element of the mixed color dithered main image having the validity-indicative value and matrix elements of the three primary colors each corresponding to the matrix element of the mixed color dithered main image having the validity-indicative value comes to have the validity-indicative value redundantly. As a result, the mixing of colors through the primary color dithered main images for the three primary color and the mixing of colors through the mixed color dithered main image are made redundant. In the tape printing apparatus 1, however, this color redundancy can be avoided by the above cancellation of redundant validity. Further, when the above-mentioned four colors of C, M, Y, and K are used, for instance, more attractive black can be obtained in general by printing K (black) alone than by printing K (black) through actually mixing C (cyan), M (magenta) and Y (yellow), so that by canceling the value indicating validity of the corresponding matrix elements of primary color dithered main images for the three primary colors, as described above, it is possible to obtain a beautiful image printed by using the four colors can be obtained.

In the mixed color valid matrix element-deleting process, for instance, a logical NOT operation for inverting the validity-indicative value and the invalidity-indicative value is carried out on the mixed color dithered main image, to thereby form an inverted dithered mixed color main image. Then, a logical AND operation is performed between each matrix element of each primary color dithered main image and a corresponding one (corresponding in matrix element location) of the matrix elements of the inverted dithered mixed color main image, such that the validity-indicative value is output only when both the matrix elements have the validity-indicative value. Dithered main images resulting from the logical AND operation become new primary color dithered main images. In other words, in this process, by carrying out the logical NOT operation and the logical AND operation, which are relatively simple operations, out of matrix elements having the validity-indicative value of each of the primary color dithered main images for the three primary colors, each matrix element having the validity-indicative value, which corresponds in location to each matrix element of the mixed color dithered main image having the validity-indicative value, has its validity-indicative value canceled.

Figure 11A:
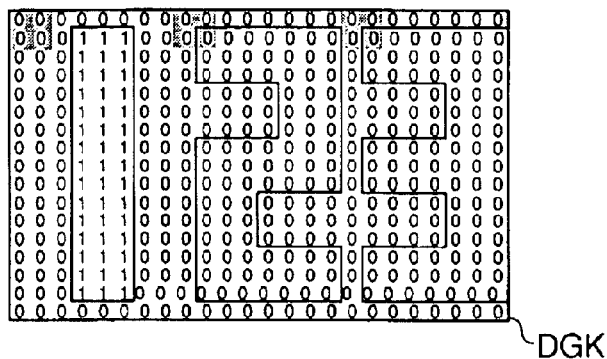
FIG. 11A is a diagram illustrating an example of dithered main image data extracted for color K of the color image corresponding to FIG. 6D.

Now, the above cancellation process will be described based on the examples described above with reference to FIGS. 6A to 10B showing the primary color whole dithered images having primary color dithered main images arranged therein and the mixed color whole dithered image having the mixed color dithered main images arranged therein. First, all the corresponding matrix elements, which commonly have the validity-indicative value "1", of the FIG. 8C primary color whole dithered image data DGY for color Y, the FIG. 9A primary color whole dithered image data DGC for color C, and the FIG. 9B primary color whole dithered image data DGM for color M, are extracted, whereby the mixed color whole dithered image data DGK, shown in FIG. 11A, for color K (mixed color) is obtained, which in the illustrated example has the same values as those of the FIG. 9A primary color whole dithered image DGC for color C.

Figure 11B:
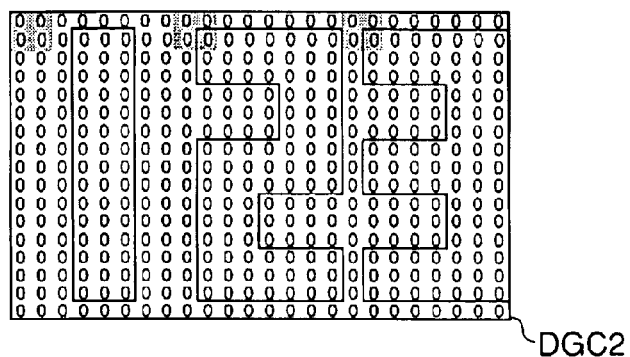
FIG. 11B is a diagram illustrating an example of the dithered main image data for color C corresponding to FIG. 9A, in which a gradation value of color K is canceled.
Figure 11C:
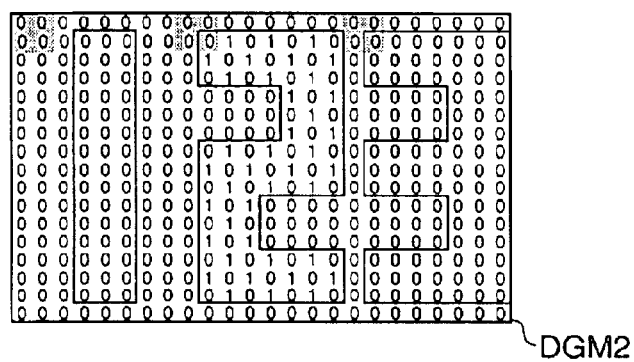
FIG. 11C is a diagram illustrating an example of the dithered main image data for color M corresponding to FIG. 9B, in which the gradation value of color K is canceled.
Figure 11D:
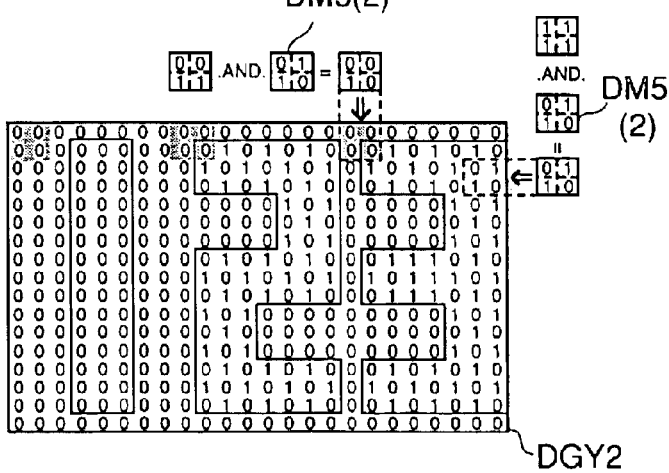
FIG. 11D is a diagram illustrating an example of the dithered main image data for color Y corresponding to FIG. 8C, in which the gradation value of color K is canceled.

If the invalidity-indicative value "0" is newly assigned to matrix elements of the primary color whole dithered image data DGY, DGC and DGM, corresponding in matrix element location and having the validity-indicative value "1" redundantly with a corresponding matrix element of the mixed color dithered main image having the validity-indicative value "1", that is, if the redundant validity-indicative value "1" of such matrix elements of the primary color whole dithered image data is canceled, the validity-indicative values "1" s' of the primary color dithered main image data of the character "1" in each of the primary color whole dithered image data items DGC, DGM and DGY are all converted to the invalidity-indicative values "0's" (see C2, M2 and Y2 at the column of No. 1 in FIG. 7). As a result of the conversion, the primary color whole dithered image data DGC, DGM and DGY are changed to primary color whole dithered image data DGC2, DGM2 and DGY2 shown in FIGS. 11B to 11D, respectively.

As a result, at step S90 in FIG. 3 for printing print images, the print image PGK for color K (mixed color), a print image PGC2 for color C, a print image PGM2 for color M and a print image PGY2 for color Y, appearing in FIGS. 12A to 12D, respectively, are printed based on the mixed color whole dithered image data item DGK, the primary color whole dithered image data items DGC2, DGM2 and DGY2, shown in FIGS. 11A to 11D, respectively. This makes it possible to print the whole color image, which is subjected to the color dithering, by employing the four colors C, M, Y, and K as the basic colors therefor.

Figure 13:
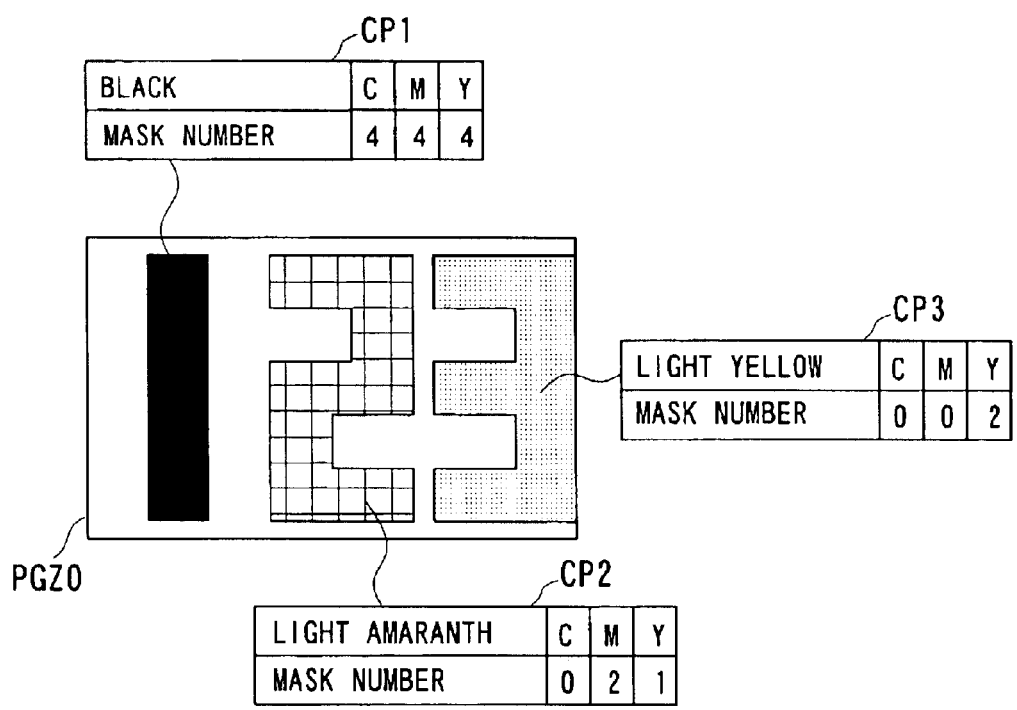
FIG. 13 is a diagram schematically illustrating an image to be formed from the data shown in FIGS. 6A to 12D, which is useful in explaining image data representative of the image used in forming and printing a print image as a synthesized image.

Now, for simplicity of the following description, images illustrative of the input and output to the FIG. 3 print image-forming process (S80) and print image-printing process (S90) are provided. For instance, the input and output in the examples described above with reference to FIGS. 6A to 12D are shown in FIG. 13. In the above examples, it is assumed that the character string image (main image) of the character string "123" is a whole image, the main shape image data SG1, SG2 and SG3 of the character images (main images) of the characters "1", "2" and "3" as image elements of the whole image, and the color palette data CP1, CP2 and CP3 of the main shape image data for the respective items of the main shape image data are the input (data), while print images are the output.

In the above case, the FIG. 6B main shape image data SG1, SG2 and SG3 representing main shape images of the characters "1", "2" and "3" can be readily imagined by viewing a print image PGZ0 shown in FIG. 13 in which colors are displayed in shades and the like such that they are distinguishable from each other. Further, the color palette data CP1, CP2 and CP3 are displayed in the same format as displayed in FIG. 6C and at the same time such that each of them is connected to a corresponding character image (in the print image PGZ0) designated to a color represented by the same, by a line. In short, with reference to FIG. 13, it is possible to imagine the input and output to the print image-forming process (S80) and the print image-printing process (S90) in the examples described hereinabove with reference to FIGS. 6A to 12D. It should be noted that a contour line of each image element (each character image, in this example) in each figure is drawn for purposes of ease of understanding as described above but not printed (the same applies hereinafter).

Figure 14A:
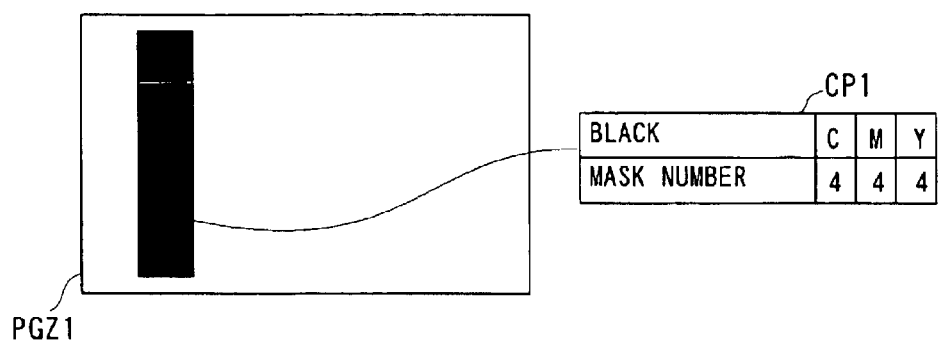
FIGS. 14A, 14B and 14C are diagrams illustrating examples of image elements decomposed from the FIG. 13 synthesized image.
Figure 14B:
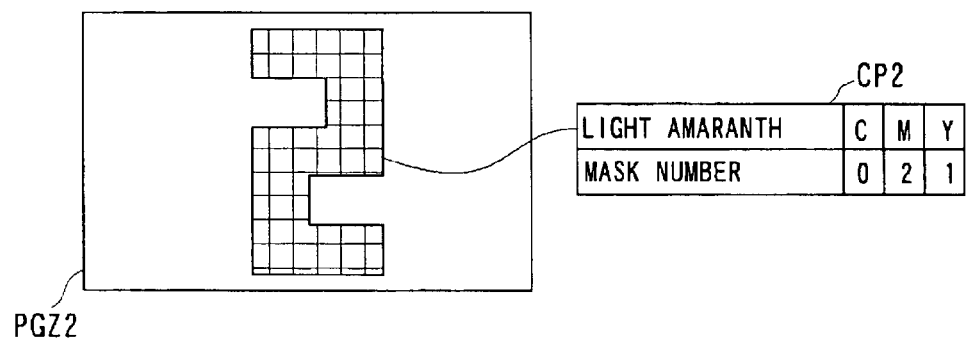
Figure 14C:
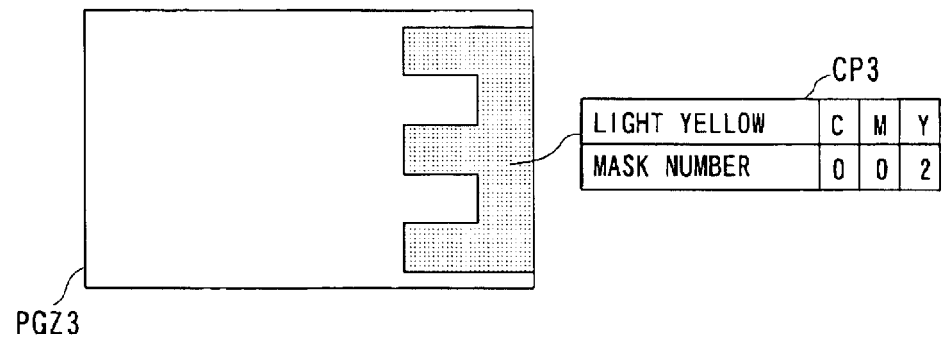

Further, in the above case, the FIG. 13 print image PGZ0 can also be regarded as a synthesized image formed by synthesizing image elements, PGZ1, PGZ2 and PGZ3 shown in FIGS. 14A to 14C. In this case, for instance, in the print image-forming process (S80) described above with reference to FIG. 4, first, the main image-forming process (S81) for forming a main image of the character "1", that is, the image element PGZ1, and the dithering (S82) of the main image formed are carried out. Next, the same main image-forming process (S81) is carried out on the character "2", that is, the image element PGZ2 and the dithering (S82)

is carried out on the main image formed. Further, the same main image-forming process (S81) is carried out on the character "3", that is, the image element PGZ3 and the dithering (S82) is carried out on the main image formed. If there is a background image to be added, the background image is read in (S83) and the dithering is carried out on the same (S84). Next, the dithered background image is synthesized with the dithered main images (S85) to thereby form synthesized image data representing the FIG. 13 synthesized image (print image) PGZ0, followed by terminating the print image-forming process (S80) at step S86.

Then, by carrying out the FIG. 3 image-printing process (S90), the print image PGZ0 is printed based on the synthesized image (print image) data formed, followed by terminating the image-forming/printing process (S10) at step S110. In the following description, such a case as described above will be briefly described, for instance, such that "when printing is instructed by the user as shown in FIG. 3 (S70) at a time main shape image data (not shown) of each image element and the color palette data CP1, CP2 and CP3 (CP1 to CP3) shown in FIG. 13 have been prepared for processing, the print image PGZ0 shown in the figure is formed and printed (S80 and S90), followed by terminating the image-forming/printing process (S10) at step S110".

Figure 15A:
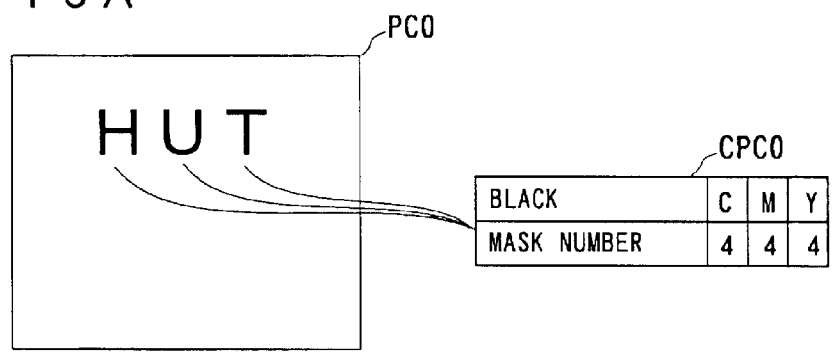
FIG. 15A is a diagram similar to FIG. 13, which illustrates an example of a main image.

For instance, FIG. 15A shows an example in which the character string image of a character string "HUT" is processed to be a print image. In this process, although the character sting image may be decomposed into image elements of characters "H", "U" and "T" to carry out an image-forming/synthesizing process on the same, to thereby form a print image PC0, similarly to the case of the FIG. 13 example being decomposed into the image elements in the FIGS. 14A to 14C, this is not limitative, but as shown in FIG. 15A, the characters "H", BUT and "T" have color palette data CPC0 in common, so that it is possible to treat the whole character string image as one image element (image element=main image=synthesized image, in the example). In this case, when printing is instructed by the user as shown in FIG. 3 (S70) at a time main shape image data (not shown) of the FIG. 15A image elements and the color palette data CP0, CP2 and CP3 (CP1 to CP3) shown in the figure have been prepared for processing, the print image PC0 shown in FIG. 15A is formed and printed (S80, S90), followed by terminating the image-forming/printing process (S110).

Generally, not only an image of characters and in image forming the background thereof but also an image of a desired diagram or a picture can be formed in the same manner. More specifically, also when a diagram or a picture as part of a whole image has a gray tone or color designated therefor, an image of the diagram or picture is regarded as an image element, and an image (elementary main image) forming a main part of the diagram or the picture corresponds to a main shape image, and can be distinguished from a background thereof (elementary background image), with at least all the valid pixels of the elementary main image being set to an identical gradation value or an identical set of gradation values. Further, however complicated a plotted image is, it can be decomposed into image elements by regarding the plotted image as a synthesized image (whole image) formed by synthesizing the image elements in each of which at least all the valid pixels of an elementary main image thereof have an identical gradation value or an identical set of gradation values. Further, each image element can be decomposed into an elementary main image and an elementary background image other than the elementary main image. The elementary main image and the elementary background image can be distinguished from each other. Hence, dithered images corresponding to respective image elements are formed and combined with each other (corresponding matrix elements are superimposed one upon the other: i.e. synthesized), whereby a dithered image formed by carrying out the dithering on the complicated plotted image can be obtained.

Figure 15B:
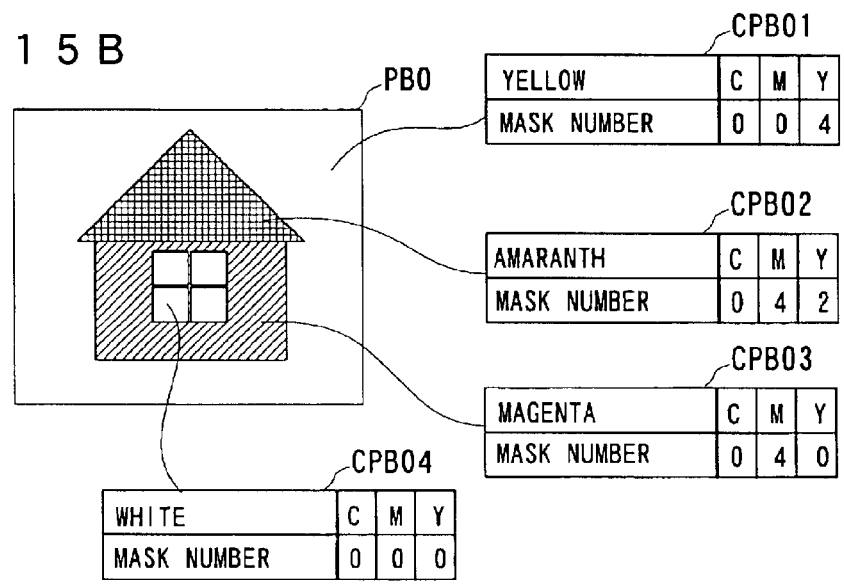
FIG. 15B is a diagram similar to FIG. 13, which illustrates an example of a background image.
Figure 16A:
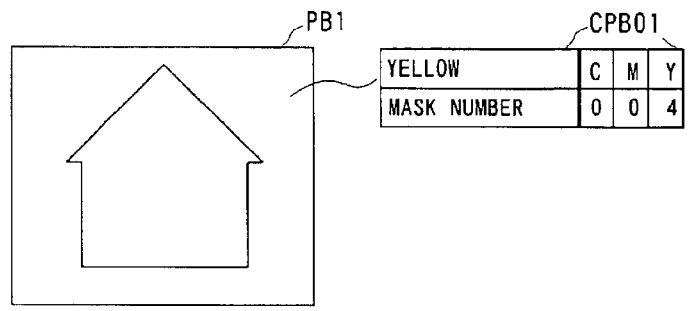
FIGS. 16A, 16B, 16C and 16D are diagrams illustrating examples of image elements decomposed from the FIG. 15B background image.
Figure 16B:
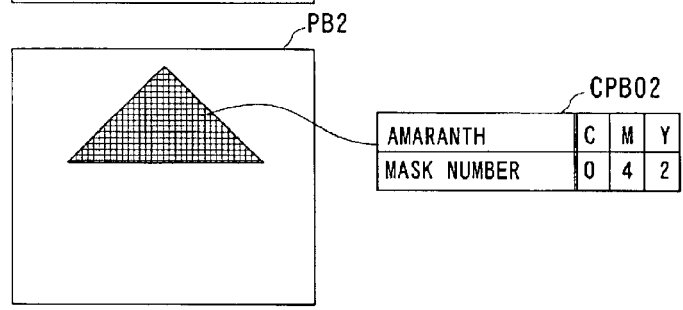
Figure 16C:
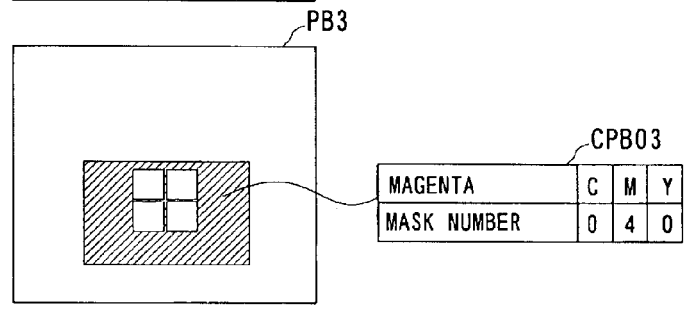
Figure 16D:
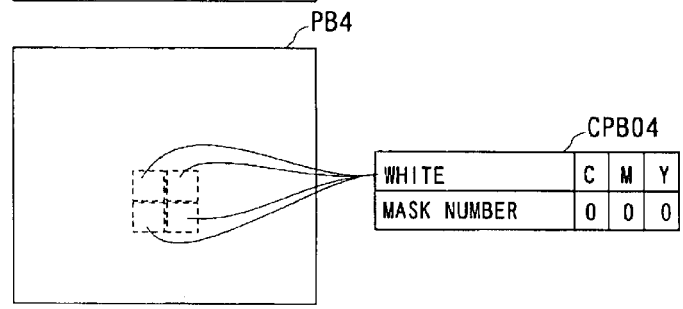

For instance, FIG. 16B shows an example in which an image (plotted image) in the form of a graphical image representative of the hut is processed into a print image. In this case, similarly to the case of the FIG. 13 example being decomposed into the image elements in the FIGS. 14A to 14C, the plotted image is decomposed into image elements PB1, PB2, PB3 and PB4, as shown in FIGS. 16A to 16D, and the image-forming/synthesizing process is carried out on the image elements, whereby the plotted image can be printed as a print image PB0. In this case, when printing is instructed by the user as shown in FIG. 8 (S70) at a time main shape image data (not shown) of each of image elements and color palette data CPB01 to CPB04 in FIG. 15B have been prepared for processing, the print image PB0 shown in FIG. 15B is formed and printed (S80, S90), followed by terminating the image-forming/printing process (S110). A contour line of each image element in each figure is drawn for purposes of ease of understanding as described above, but not printed. Further, particularly in this example, it is possible to omit each process on the image element PB4 of a window whose printing color is specified to "white" (all the gradation values "0": mask number "0") (the same applies to windows in FIGS. 17 to 19 referred to hereinbelow; hence, contour lines of frames of the window in FIG. 16D are shown by dotted lines (imaginary lines).

Although in generalized description, the print image-forming process (S80) described above with reference to FIG. 4 will be described to be comprised of the following steps: first image element data preparation (S81), first image element dithering (S82), second image element data preparation (S83), second image element dithering (S84), third image element data preparation, not shown, third image element dithering, not shown, . . . , image synthesis (S85), termination of the subroutine (S86), in the FIG. 4 example, the above first image element and second image element are referred to as the "main image(s)" and the "background image" for convenience of description. That is, in general, to obtain a desired synthesized image, it is only required to prepare image data elements of a required number of image elements and carry out dithering on each image data element. Description of the FIG. 4 process implies this concept as well. However, for purposes of (convenience of) description of a synthesized image, referred to hereinbelow, let it be assumed that an image element necessitated to be newly formed is referred to as a "main image", while an existing image element, such as a background image, which can be selected in a background image-selecting process (S22 in FIG. 3), described hereinafter, is referred to as a "background image", unless otherwise specified.

For instance, FIG. 17 shows an example in which a print image is formed from a synthesized image formed by synthesizing the character string image of the character string "HUT" (treated as a main image in a manner corresponding to description of a synthesized image described hereinafter), described above with reference to FIG. 15A, with a plotted image (treated as a background image) in the form of a graphical image representative of the hut, described above with reference to FIG. 15B. As described above, in this case, the plotted image (background image) can be decomposed into the image elements PB1, PB2, PB3 and PB4 appearing in FIGS. 16A to 16D. Therefore, the FIG. 17 synthesized image can be formed by decomposing the same into the main image PC0 and the image elements PB1, PB2, PB3 and PB4 of the background image forming each of them, and then synthesizing them. The FIG. 17 synthesized image thus formed can be printed as a print image (synthesized image) PG0.

Further, in this case, when printing is instructed by the user as shown in FIG. 3 (S70) at a point in time main shape image data, not shown, of the main image out of the FIG. 17 image elements, main shape image data (hereinafter referred to as "background shape image data". Further, hereinafter, shape image data of image elements is is generically referred to as "elementary shape image data") of the background image out of the same, and color palette data CPC and CPB01 to CP93 have been prepared for processing, the print image PG0 shown in FIG. 17 is formed and printed (S80, S90), followed by terminating the image-forming/printing process (S110). Although the main image can be produced as a synthesized image by synthesizing a plurality of image elements having different gradation values designated on a character-by-character basis, similarly to the case the character string "123" described above with reference to FIGS. 6A to 14C, for purposes of simplicity, the following description will be made assuming that one color is designated as the color of the characters. It goes without saying that the processing is carried out in the same manner when the characters have different colors from each other.

Further, although the dithering was effected (S82 and S84) on each image element (the main image and the background image, for instance) in the FIG. 4 print image-forming processes (S80) described in detail hereinbefore, this in not limitative but, for instance, in the example shown in FIG. 13, if dithering can be effected on the pixels inside the contour line of the main shape image of each character image (image element) by using a dither mask other than one for the pixels outside the contour line, the dithering (S82, S84 and the like) on image element-by-image element basis, may be omitted to carry out dithering on a synthesized image formed, instead, after the image elements are first synthesized with each other (S85) (portion of FIG. 4 flow indicated by dotted lines). Further, since the present embodiment employs the ink jet printing method, it is required to carry out dithering processing to print images having multi-valued gradation values. However, in a tape printing apparatus which is capable of dispensing with dithering, that is, which is capable of printing images having multi-valued gradation values as they are, the above dithering processing can be omitted.

Generally, a main image and a background image are not necessarily formed or recorded (registered) as image elements to be formed into a synthesized image from the beginning, that is, as a main image and a background image from the beginning. More often, they are formed so as to separately display or print the same as individual images. In other words, images formed in order to separately display or print the same as individual images are not formed assuming that they are synthesized with each other, so that a synthesized image formed by using them as main and background images becomes hard to view or recognize as well as unattractive, since relationship between the densities or colors of the images is made unbalanced depending on a combination thereof.

To eliminate the above inconveniences, in the tape printing apparatus 1 are employed not only the image-forming method (first synthesized image-forming method) which is capable of forming a synthesized image by carrying out the image synthesis described above with reference to FIG. 17 but also an image-forming method (second synthesized image-forming method) which is capable of forming an attractive synthesized image by synthesizing a main image with a background image having a density suitable for the main image, through the use of an existing image as the background image, and an image-forming method (third synthesized image-forming method) which is capable of forming a synthesized image with excellent appearance, by synthesizing a main image having a color suitable for the color of a background image and the background image with each other, through the use of an existing image as the background image.

More specifically, for instance, the synthesized image (print image) PG0 described above with reference to FIG. 17 can be formed as the image element described above with reference to FIGS. 15A and 15B by the first synthesized image-forming method. Further, by the second synthesized image-forming method, a synthesized image (print image) PGA, shown in FIG. 18, can be formed and printed which has a background image thereof adjusted such that the background image has a lower density than that of the background image of the FIG. 17 synthesized image (print image) PG0, and a main image thereof synthesized with the background image. Furthermore, by the third synthesized image-forming method, a synthesized image (print image) PGB, shown in FIG. 19, can be formed and printed which has a main image having a color adjusted in a manner matching the color of a background image therefor. In the following, the above methods will be described in detail.

Figure 20:
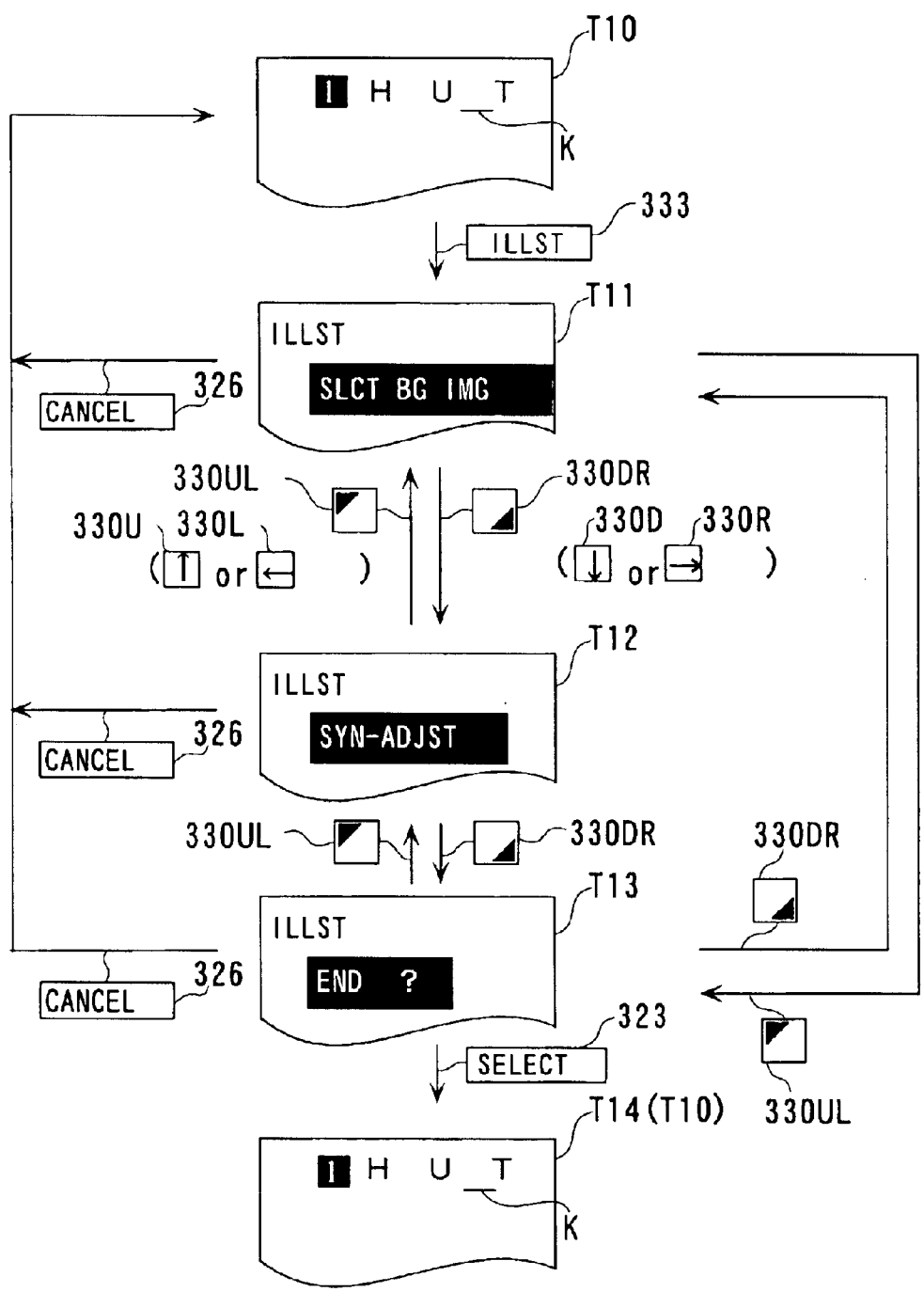
FIG. 20 is a diagram schematically illustrating examples of a display screen and an operating procedure carried out on the display screen, which is useful in explaining an entry/selection/setting operation in FIG. 3 for forming a synthesized image.

First, an example of the procedure of entry, selection and setting operations (S20) described above with reference to FIG. 3 will be described. For instance, as shown in FIG. 20, if the illustration key 333 is depressed by the user when the text entry screen displays a first line of a character string "HUT" entered by the user (screen T10: hereinafter, contents displayed on the display screen of the display 4 are referred to as the "screen T??" (? represents a digit) and the reference numerals for the screens are shown only by T??. Further, a cursor position is indicated by a symbol K), an "ILLST" (illustration) selection screen for selecting settings for synthesis of images, that is, a selection screen positioned at a first hierarchical level for setting an illustration is displayed (T11). It should be noted that in the tape printing apparatus 1, the user can cancel instructions provided via the keyboard 3 by operating the cancel key 326. That is, the selection screen can be returned to the original text entry screen (T10) by depressing the cancel key 326 in the state of any of the screens T11 to T13 at the first hierarchical level being displayed (the cancel key 326 similarly acts unless otherwise specified, and hence description of the function thereof will be omitted hereinafter).

On the selection screen (T11), menu options, such as "SLCT BG IMG (select background image)", "SYN-ADJST (synthesis-adjustment)", "END ?" and the like, are displayed as menu options to be selected for setting the illustration ("ILLST"). The user can display any one of the menu options in reverse video or highlighted by operating the cursor key 330 and depress the selection key 323, thereby selecting and designating the highlighted menu option. Referring to FIG. 20, immediately after the illustration key 333 is depressed, a menu option selected the last time (or a menu option selected by default according to the result of initialization of the system, if there is no menu option selected the last time), such as the menu option "SLCT BG IMG (select background image)" out of the menu options appearing in the figure, is displayed in reverse video i.e.

highlighted (T11). When the selection key 323 is depressed by the user in this state (T11), the menu option "SLCT BG IMG (select background image)" is selected to switch to a "BG IMG" (background image) selection screen at a second hierarchical level thereof (see FIG. 21). Further, when the down arrow key 330D or the right arrow key 330R is depressed in the state of T11, the menu option "SYN-ADJST (synthesis-adjustment)" is highlighted (T12). When the selection key 323 is depressed in this state (T12), the menu option "SYN-ADJST (synthesis-adjustment)" is selected to switch to a selection screen at a second hierarchical level thereof (synthesis-adjustment) (see FIG. 23).

As described above, a menu option highlighted on the selection screen of the tape printing apparatus 1 is one selected for setting by a subsequent user's operation of the selection key 323, and hence the menu option in this state is referred to as an "option highlighted for selection". More specifically, when the down arrow key 330D or the right arrow key 330R is depressed with the menu option "SLCT BG IMG (select background image)" being highlighted for selection (T11), the menu option "SYN-ADJST (synthesis-adjustment)" is highlighted for selection (T12). Similarly, when the up arrow key 330U or the left arrow key 330L is depressed with the menu option "SYN-ADJST (synthesis-adjustment)" comes to be highlighted for selection (T12), the menu option "SLCT BG IMG (select background image)" comes to be highlighted for selection (T11). In the following, for efficiency of description, the down arrow key 330D and the right arrow key 330R are collectively referred to as the "cursor key 330DR" which is represented in FIG. 20 as a box containing a black triangle pointing in a downward and rightward direction. Similarly, the up arrow key 330U and the left arrow key 330L are collectively referred to as the "cursor key 330UL" which is represented in the figure as a box containing a black triangle pointing in a upward and leftward direction.

Similarly, when the cursor key 330DR is operated in the state of the menu option "SYN-ADJST (synthesis-adjustment)" being highlighted for selection (T12), the menu option "END ?" is highlighted for selection (T13). Similarly, following the above, whenever the cursor key 330 DR is operated, all the menu options are sequentially highlighted for selection cyclically in the order of the menu options "SLCT BG IMG (select background image)", "SYN-ADJST (synthesis-adjustment)", "END ?", "SLCT BG IMG (select background image)", "SYN-ADJST (synthesis-adjustment)", and so on (T11 to T13). By depressing (operating) the selection key 323 in the state of each of the menu options being highlighted for selection, the user can determine the selection of a desired menu option. Further, from in the state of the menu option "SYN-ADJST (synthesis-adjustment)" being highlighted for selection (T12), whenever the cursor key 330UL is operated, all the menu options are sequentially highlighted for selection cyclically in the reverse order, that is, in the order of the menu options "SYN-ADJST (synthesis-adjustment) ", "SLCT BG IMG (select background image)", "END ?", "SYN-ADJST (synthesis-adjustment) ", and so on. In short, the user can display a desired menu option for selection by operating the cursor key 330 (cursor key 330 DR or cursor key 330UL) and determines the selection i.e. sets the desired menu option by operating the selection key 323. When the selection key 323 is depressed in the state of the menu option "END ?" being highlighted for selection, the screen returns to the original text entry screen (T14: the same as T10).

Figure 21:
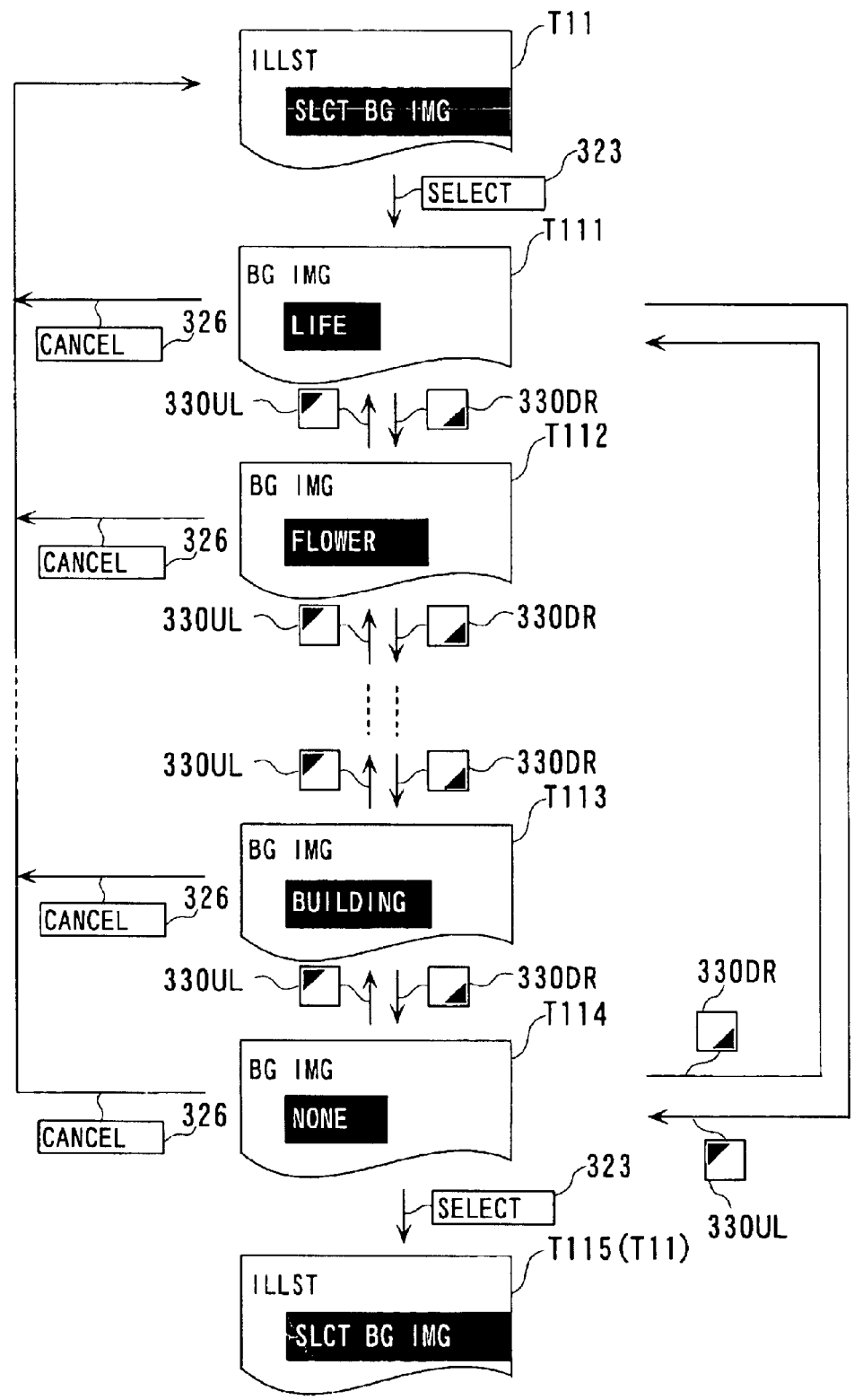
FIG. 21 is a diagram schematically illustrating examples of a display screen at a lower hierarchical level with respect to a selection screen in FIG. 20 and an operating procedure carried out on the screen, which is useful in explaining a step of selecting a background image in FIG. 3.

Next, for instance, as shown in FIG. 21, when the selection key 323 is depressed in the state of the menu option "SLCT BG IMG" (select background image) being displayed on the "ILLST" (illustration) selection screen (T11: commonly shown in FIG. 20), the menu option "SLCT BG IMG" (select background image) is selected to switch to the "BG IMG" (background image) selection screen at the second hierarchical level (T111). On the "BG IMG" (background image) selection screen, menu options, such as "LIFE", "FLOWER", "EVENT", "SET PHRASE", "BUILDING", and "NONE" (no background image), are displayed as menu options to be selected for designating a background image. The user can display the menu options cyclically to select a desired one by operating the cursor key 330 (T111 to T114), similarly to the case of the selection screen at the first hierarchical level. When the selection key 323 is depressed in the state of the menu option "NONE"(no background image) being highlighted for selection (T114), a mode of "no background image" (i.e. a mode without execution of synthesis of the main image with a background image) is selected or set (S22 in FIG. 3), and the screen returns to the original text entry screen (T115: the same as T11). Subsequently, as described above with reference to FIG. 20, when the option "END ?" is highlighted for selection and the selection key 323 is depressed in the state (T13), the screen returns to the original text entry screen (T14: the same as T10).

Referring to FIG. 3, after the above-mentioned settings (S20) have been completed, it is determined at step S30 whether or not the automatic character color adjustment is set. Now, since the mode of the automatic character color adjustment is not set (No to S30), setting of a character color by the user is awaited (S40). Here, if "BLACK (color K)" common to each character of the character string "HUT" is set by the user, as in the example described above with reference to FIG. 15A, the color pallet data CPC0 described hereinbefore is stored (set) in the color pallet data area 247 of the RAM 240 as color pallet information of the main image (S40). After the character color has been set (S40), it is determined at step S50 whether or not the mode of adjustment of gradation values of the background image (background gradation value adjustment) is set. Here, since this mode is not set (no to S50), the print instruction wait state for waiting for a print instruction (S70) is enabled and maintained. That is, at this time, the main shape image data, not shown, of the FIG. 15A image element and the color pallet data CPC0 have been prepared for processing, so that when printing is instructed by the user (S70), the print image PC0 appearing in FIG. 15A is formed and printed (S80 and S90), followed by terminating the image-forming/printing process (S10) at step S110.

Although in the above description, it was described to the effect that at the time of enabling and maintaining the print instruction wait state (S70), the main shape image data of the FIG. 15A image element has been prepared, actually, the main shape image data is prepared at the FIG. 4 main image-forming process (S81), as described above with reference to FIGS. 3 and 4. However, the preparation for forming the main shape image data has been completed before the print instruction wait state is enabled and maintained, and hence for simplicity, similar description is made hereinafter as well. Further, although in the present embodiment, it was described to the effect that print instruction is awaited (S70) and then the print image-forming process is carried out (S80), this is not limitative, but the procedure may be configured such that whenever any entry, selection and setting operations are carried out, a print image is newly formed in accordance therewith (the FIG. 3 print instruction (S70) and print image-forming process (S80) are carried out in the reverse order), similarly to the display image delivered to the display 4. In this case, the main shape image data of the FIG. 15A image element has been prepared at the time point of enabling and maintaining the print instruction wait state, in accordance with the above description.

As described above, on the FIG. 21 "BG IMG" (background image) selection screens (T111 to T114) provided at the second hierarchical level, the menu options, such as "LIFE", "FLOWER", "EVENT", "SET PHRASE", "BUILDING", and "NONE" (no background image), are displayed as the menu options to be selected for designating a background image. At the third hierarchical level under the menu option of "LIFE", there are displayed menu options, such as "MOUSE", "CAT", "DOG", "COW" and "TIGER". By selecting one of them, the user can select a background picture (background image) in the form of a graphical image representative of an animal having the selected name. Further, at the third hierarchical level under the menu option of "FLOWER", there are displayed menu options, such as "CHERRY BLOSSOM", "SUN FLOWER", and "ROSE". By selecting one of them, the user can select a background image in the form of a graphical image representative of a flower having the selected name. Similarly, at the third hierarchical level under the menu option of "EVENT", there are provided menu options, such as "ENTRANCE CEREMONY", "GRADATION CEREMONY", and "ATHLETIC MEET". By selecting one of them, the user can select a background image in the form of a graphical image representative of an event having the selected name. The candidates for (background image data representative of) a background image are selected from (image data items representative of) images stored (registered) in the registered image data area 245. They are stored beforehand in the background image data area 248 together with corresponding character color data described hereinafter.

Further, at the third hierarchical level under the menu option of "SET PHRASE", there are provided menu options, such as "BIG SALE", "SALE", and "RECOMMENDED". By selecting one of them, the user can select an image of a character string of a set phrase for the selected option as a background image. In this case, candidates for the background image are formed and stored in the following manner: First, an arbitrary character string is entered via the keyboard 3 and registered as a background image after designation of a character color thereof. Next, the contour line image-forming process and the filling process (process of filling the inside of a contour line) are carried out on the candidate background image based on the text data of the character string, similarly to the main image formed in the main image-forming process (S81) described above with reference to FIG. 4, to form the candidate background image as background shape image data. Then, the candidate background image is stored beforehand as background image data formed of color palette data and background shape image data, in the background image data area 248 with corresponding character color data (described hereinafter). In other words, a character string, such as the FIG. 15A character string "HUT", can be registered beforehand as a background image, and if only the same is registered, it can be selected as the background image.

Figure 22:
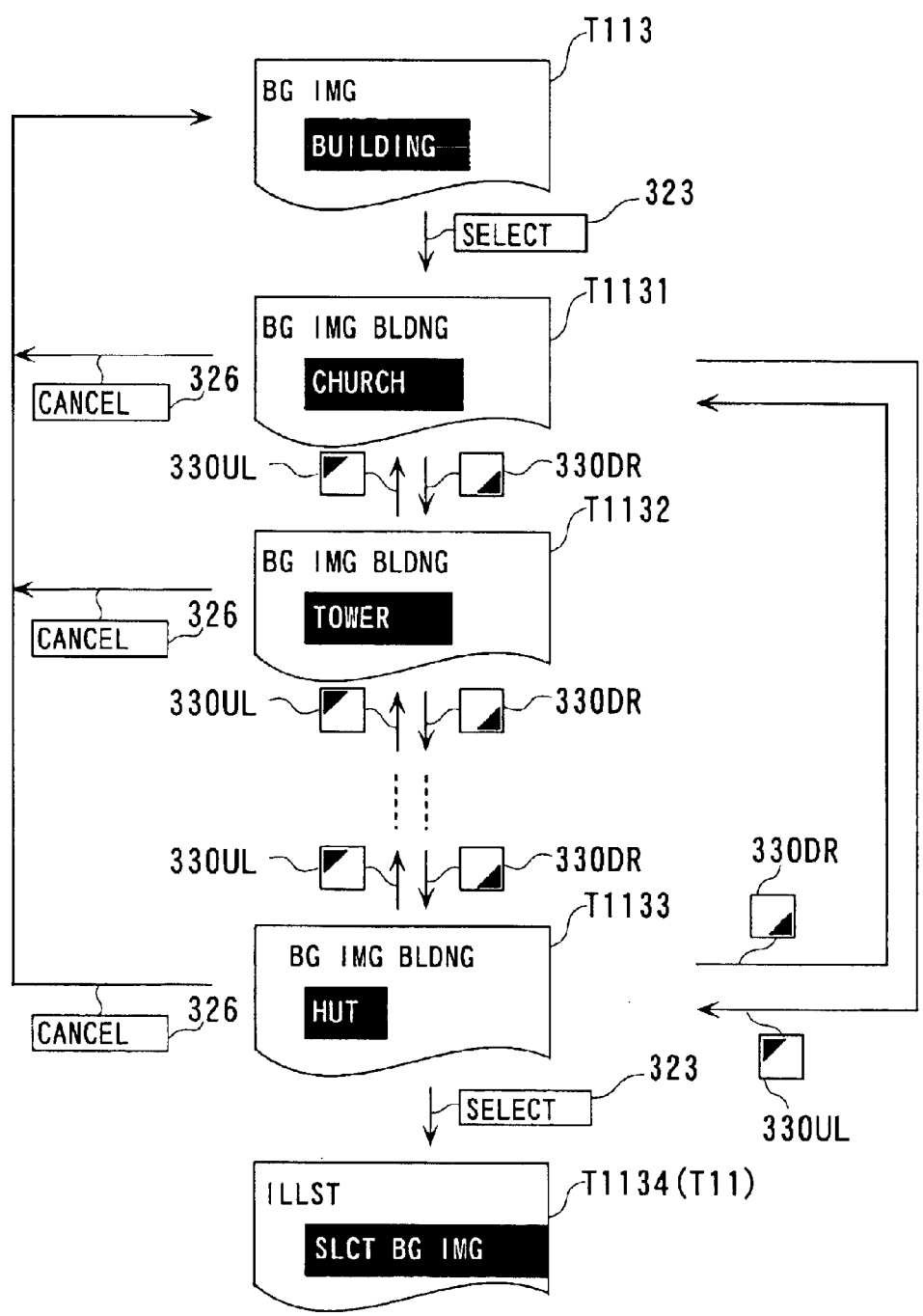
FIG. 22 is a diagram schematically illustrating examples of a display screen at a still lower hierarchical level with respect to a selection screen in FIG. 21 and an operating procedure carried out on the screen.

When the selection key 323 is depressed in a state in which the option "BUILDING" is highlighted for selection out of the menu options "BG IMG" (background image), (T113: commonly shown in FIG. 21) e.g. as shown in FIG. 22, the option "BUILDING" is selected to switch to a selection screen for selecting a building as the background image (i.e. "BG IMG BLDNG" (background image building) selection screen) at the third hierarchical level (T1231). On the background image building selection screen, there are displayed menu options, such as "CHURCH", "TOWER", and "HUT", for selection of a graphical image of a building as the background image. The user can cyclically display the menu options to select a desired one, by operating the cursor key 330 (T1131 to T1133), similarly to the case of the selection screen at the first hierarchical level. When the selection key 323 is depressed in the state of the menu option "HUT" being highlighted for selection (T1133), the option "HUT" is selected for designating the graphical image thereof as the background image (S22 in FIG. 3). Then, the screen returns to the original "ILLST" (illustration) selection screen at the first hierarchical level (T1134: the same as T11). In this case as well, the candidates for a background image of this type are selected from images stored (registered) in the registered image data area 245 as background image candidates. They are stored beforehand in the background image data area 248 with corresponding character color data described hereinafter. The background graphics (background image) representative of the option "HUT" selected in the above example is the graphical image of the hut, described above with reference to FIG. 15B.

Figure 23:
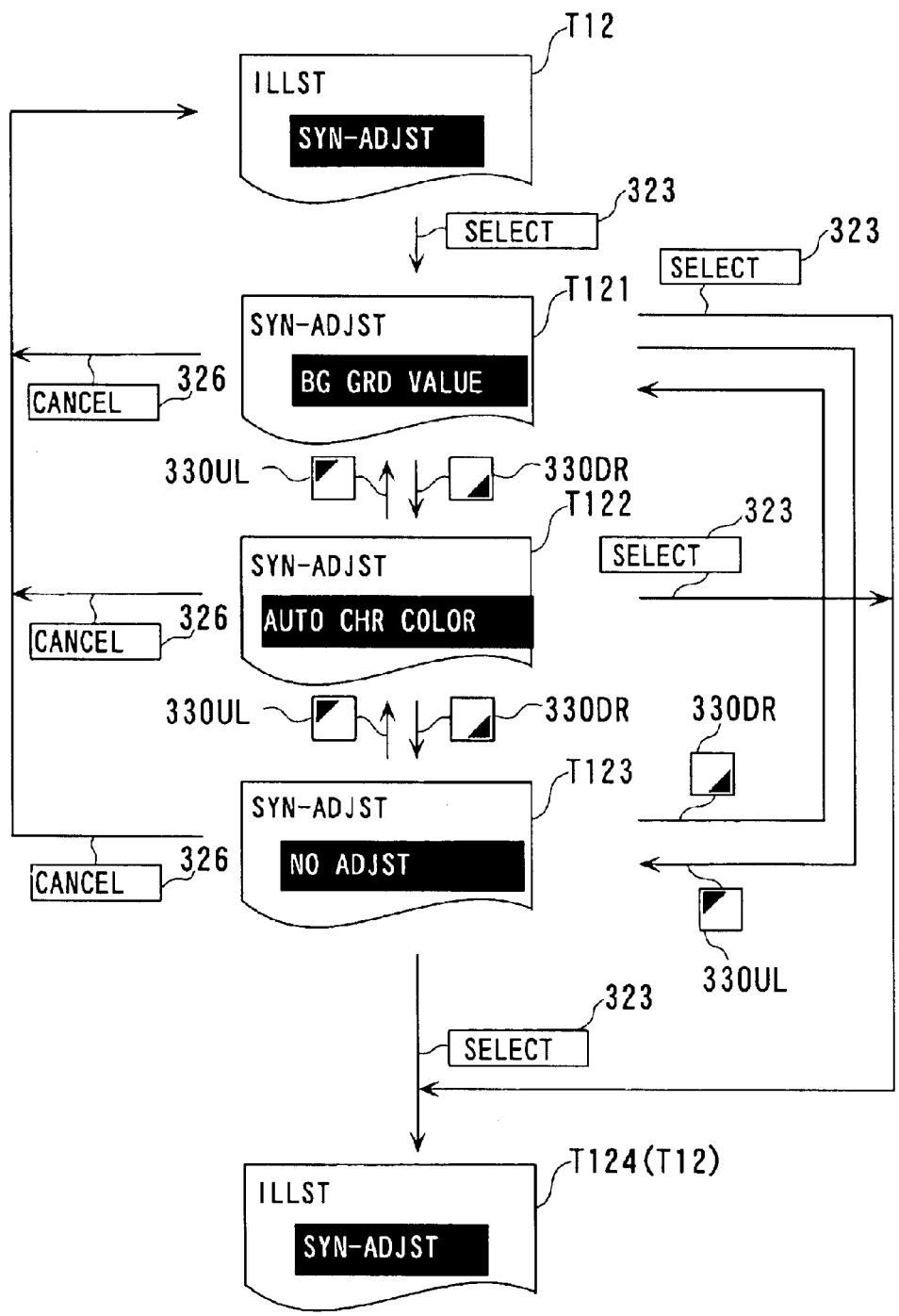
FIG. 23 is a diagram schematically illustrating examples of a display screen at a lower hierarchical level with respect to the selection screen in FIG. 20 and an operating procedure carried out on the screen, which is useful in explaining a step of selecting a synthesis-adjustment option in FIG. 3.

Now, when the menu option "SYN-ADJST (synthesis-adjustment)" is highlighted for selection by the user, and the selection key 323 is depressed in this state (T12: commonly shown in FIGS. 20 and 23), as described above with reference to FIG. 20, the menu option "SYN-ADJST (synthesis-adjustment)" is selected to switch to the "SYN-ADJST" (synthesis-adjustment) selection screen at the second hierarchical level (T121), as shown in FIG. 23. On this selection screen, menu options, such as "BG GRD VALUE (background gradation value)", "AUTO CHR COLOR (automatic character color adjustment)", "NO ADJST" (no synthesis-adjustment), etc., are displayed as options for synthesis and adjustment of images. The user can display the menu options cyclically to select a desired one by operating the cursor key 330 (T121 to T123), similarly to the case of the selection screen at the first hierarchical level. When the selection key 323 is depressed in the state of the menu option "NONE" (no synthesis-adjustment) being highlighted for selection (T123), a mode of "no synthesis-adjustment" (that is, a mode using the first synthesized image-forming method which does not carry out adjustment of images during the image-synthesizing process) is selected for setting the same (S23 in FIG. 3), and the screen returns to the original "ILLST" (illustration) selection screen (T124: the same as T12). Here, as described above with reference to FIG. 20, when the selection key 323 is depressed in the state of the option "END ?" being highlighted for selection (T13), the screen returns to the original text entry screen (T14: the same as T10).

As shown in FIG. 3, after the above settings (S20) have been completed, it is determined at step S30, whether or not the mode of the automatic character color adjustment is set. Here, since this mode is not set (No to S30), the setting of a character color by the user (S40) is awaited. When "BLACK (color K)" common to each character of the character string "HUT" is set by the user, as shown in the example described above with reference to FIG. 15A, the color pallet data CPC0 described hereinbefore is stored (set) in the color pallet data area 247 of the RAM 240 as color pallet information of the main image (S40). After the character color has been set (S40), it is determined at step S50 whether or not the mode of the adjustment of background gradation values is set. Here, since this mode is not set (no to S50), the print instruction (S70) wait state is enabled and maintained. That is, at this time of the procedure of the present case, the elementary shape image data, not shown, of the FIG. 17 image elements (main image and background image) and the color pallet data CPC0, CPB01 to CPB03 have been prepared for processing, so that when printing is instructed by the user (S70), the print image PG0 appearing in FIG. 17 is formed and printed (S80, S90), followed by terminating the image-forming/printing process (S10) at step S110.

As described above, in the tape printing apparatus 1, a synthesized image is formed as desired by synthesizing a main image and a background image represented by respective image data items having n-valued gradation values each having any one of n possible values (n is an integer which is equal to or larger than 3; n=5 in the present embodiment) and defining a density of each pixel. More specifically, as described above with reference to FIGS. 21 and 22, (image data representative of) an image as a candidate for (background image data representative of) the background image is stored in advance in the background image data area 248 with the corresponding character color data, described hereinafter, and an arbitrary one of a plurality of types of candidates for the background image is selected as the background image (in the background image-selecting process (S22) in FIG. 3). As described above, data items of the plurality of types of candidates for the background image include arbitrary image data items arbitrarily formed by plotting the candidates as dotted images for entry in representation of desired images. That is, an image formed by plotting the same as desired can be used as the background image. It should be noted that in order to plot an image for entry, it is possible to employ a general function of non-standard character registration or plotted image registration. Further, as described hereinabove with reference to FIGS. 15A and 17, the background image data used in this case is comprised of color palette data and elementary shape image data of each of one or more image elements forming the background image.

In the first synthesized image-forming method described hereinabove, the main image data representative a main image with n-valued main image gradation values as common gradation values for all valid pixels thereof is comprised of the color palette data and the main shape image data. The color palette data is formed by the FIG. 3 character color-setting process (S40) and the main shape image data by the FIG. 4 main image-forming process (S80). Then, based on background image data and the main image data, synthesized image data is produced (by the FIG. 4 image-synthesizing process (S85)), which represents a synthesized image formed by synthesizing the main image with a background image and at the same time causing each gradation value of each pixel of the main image and the background image to reflect on the synthesized image by carrying out dithering (S82 and S84, or S87 in FIG. 4).

The tape printing apparatus 1 is of an ink jet type, in which whether or not an ink droplet is ejected is represented by a two-valued (binary) gradation value. That is, the printer block 12 of the tape printing apparatus 1 forms a printing device for printing a print image having two-valued gradation values. Further, the display 4 can be manufactured at a low cost if configured as a display device for displaying a display image having two-valued gradation values. On the other hand, in any of the (first to third) synthesized image-forming methods employed in the tape printing apparatus 1, as described above, dithering (binary dithering in the present embodiment) is carried out on a synthesized image by using dither matrix DD5 of n-valued thresholds each defined by any one of m possible numerical values (m is an integer satisfying a condition of $n \geq m \geq 2$; m=n=5 in the present embodiment) and arranged therein as matrix elements. Hence, the image forming method of the invention (the first to third synthesized image-forming methods of the embodiment) can be applied to display devices and printing apparatuses capable of processing only a gradation image (having two-valued gradation values in the present embodiment) with a limited number of gradation values smaller than (=5). This enables the method to be applied to the tape printing apparatus 1 without any problems. Further, in the tape printing apparatus 1, the above (binary) dithering is carried out by using the dither masks DM5(0) to DM5(4), so that the designated gradation value (including the gradation values of the primary colors representing colors) can be adjusted simply by changing the mask number(s) of the dither mask(s) (dither mask data).

Accordingly, in the second synthesized image-forming method described hereinbelow, dither mask data corresponding to adjusted background gradation values is set by the FIG. 3 background gradation value-adjusting process (S60) to use the same in place of dither mask data corresponding to original background gradation values, as dither mask data for use in a logical AND operation between the dither mask data and matrix data of the background image. More specifically, the mask number of each of the three primary colors (C, M, and Y) indicated by color palette data of each image element of the background image is changed into a mask number for use with the corresponding adjusted background gradation value, whereby the setting of the dither masks used in the dithering of the background image is changed. In short, according to this method, the background gradation values can be adjusted by simple operations of changing dither masks set or determined.

As described above, (image data representative of) an image as a candidate for (background image data representative of) each background image is stored in advance in the background image data area 248 with corresponding character color data. The character color data is intended in the present specification to mean a type of color palette data. More specifically, each character color (color of each main image) which will become attractive when combined (synthesized) with a specific candidate for the background image is preset in a manner correlated to the candidate, and color palette data (character color data) of each character color suitable for a corresponding background image data item to be combined (synthesized) therewith is stored in advance in the background image data area 248 in a manner correlated to the corresponding background image data item as a candidate for the background image data.

Accordingly, in the third synthesized image-forming method described hereinafter, character color data corresponding to a selected background image data item is set as color palette data of main image (character string image) at step S100 of the FIG. 3 for setting a character color corresponding to a background image, whereby dither masks suitable for combining the main image with a selected background image represented by the selected background image data item is set (mask numbers thereof are designated) as dither masks each for performing a logical AND operation between the same and matrix data of the main image (character string image).

In the following, the second synthesized image-forming method and the third synthesized image-forming method will be described one by one. First, in order to select and set the second synthesized image-forming method, the selection key is depressed in the state of the option "BG GRD VALUE (background gradation value)" being highlighted for selection (T121). This option is one of the options displayed on the "SYN-ADJST" (synthesis-adjustment) selection screen (T121 to T123) at the second hierarchical level, described above with reference to FIG. 23. When the selection key is depressed, a mode for effecting "adjustment of background gradation values" (i.e. a mode which uses the second synthesized image-forming method for adjusting background gradation values) is selected and set (S23 in FIG. 3), followed by returning to the original "ILLST" (illustration) selection screen at the first hierarchical level (T124: the same as T12). When the selection key 323 is depressed by the user in the state of the option "END ?" being highlighted for selection (T13), the screen returns to the original text entry screen (T14: the same as T10).

Referring to FIG. 3, after the above-described settings (S20) have been completed, it is determined (S30) whether or not the mode of the automatic character color adjustment is set. Now, since this mode is not set, the settings of a character color by the user (S40) is awaited. When "BLACK (color K)" common to each character of the character string "HUT" is set by the user, as in the example described above with reference to FIG. 15A, the color pallet data CPC0 described hereinbefore is stored (set) in the color pallet data area 247 of the RAM 240 as color pallet information of the main image (S40). After the character color has been set (S40), it is determined (S50) whether or not the mode of background gradation value adjustment is set. In the present case, this mode is set (Yes to S50), so that after the background gradation values have been adjusted (S60), the print instruction (S70) wait state is enabled and maintained. At this time, the elementary shape image data, not shown, of each of the FIG. 18 image elements (main image and background image) and the FIG. 18 color palette data CPC0 (the same as shown in FIG. 17), and CPBA1 to CPBA3 are prepared, so that when printing is instructed by the user (S70), the print image PGA shown in FIG. 18 is formed and printed (S80, S90), followed by terminating the image-forming/printing process (S110).

In the second synthesized image-forming method, similarly to the first synthesized image-forming method, a plurality types of (image data representative of) images as candidates for (background image data representative of) background images are stored in advance in the background image data area 248 for use in selection of a desired one of the plurality types of candidates (the FIG. 3 background image-selecting process (S22)). Further, the color pallet data is prepared by the FIG. 3 character color setting process (S40), and the main image data is formed by the FIG. 4 main image-forming process (S80) to form the whole main image data (since the FIG. 18 color palette data CPC0 is the same as the FIG. 17 color palette data CPC0, the above main image data is the same as the data formed by the first synthesized image-forming method).

Figure 18:
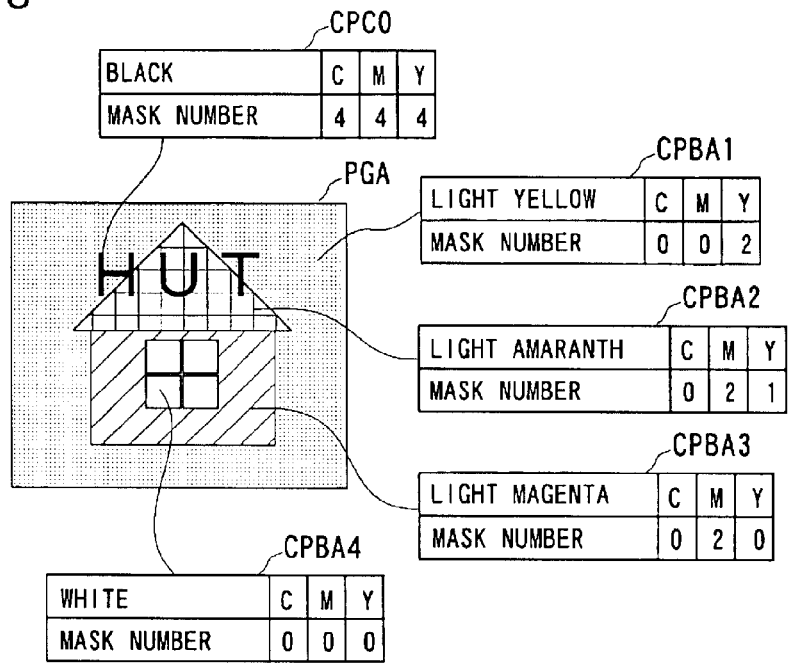
FIG. 18 is a diagram similar to FIG. 13, which illustrates a synthesized image formed by synthesizing the FIG. 15A main image with the FIG. 15B background image by a second synthesized image-forming method.

However, as is clear from comparison of the color pallet data CPB01 to CPB04 of the FIG. 17 background image with the color palette data CPBA1 to CPBA4 of the FIG. 18 background image, (color palette data CPB01 to CPB04 indicating) background gradation values as the gradation values of each pixel of the background image are adjusted by the background gradation value-adjusting process (S60) in FIG. 3, and the resulting background gradation values are set as (color palette data CPBA1 to CPBA4 indicating) the adjusted background gradation values, in place of the original background gradation values, whereby background image data is changed to form adjusted background image data (background shape image data remains identical between the original background image data and the adjusted background image data). Then, based on the adjusted background image data and the main image data, synthesized image data representative of a synthesized image formed by synthesizing the main image with the background image is produced (by the image-synthesizing process (S85) in FIG. 4), while causing the adjustment of gradation values of each pixel of the main image and the background image to be reflected on the synthesized image through the dithering (S82 and S84 or S87 in FIG. 4).

That is, according to the second synthesized image-forming method, similarly to the first synthesized image-forming method, a plurality types of existing images are stored as candidates for a background image, and a desired one of the images is selected for use as the background image, whereby a synthesized image can be formed by synthesizing a main image with the background image. Further, the gradation values of the background image, which are not adjusted by the first synthesized image-forming method, are adjusted, whereby it is possible to form a synthesized image with excellent appearance by synthesizing the main image with the background image having a suitable density of a color or pixels for the main image.

In the above case, background gradation values are adjusted such that the density of the background image is reduced. That is, in the present embodiment, an image having a higher density has larger gradation values, so that adjustment of gradation values is performed such that the gradation values of the background image are reduced. Of course, differently from the present embodiment, if an image having a lower density has larger gradation values, adjustment of gradation values may be performed such that the gradation values of the background image are increased. As results of the adjustment, the background image has a lower density (than the FIG. 17 synthesized image PG0, as shown by the FIG. 18 synthesized image PGA), whereas the main image comes to have a relatively higher density. Therefore, gradation values can be adjusted such that the main image is emphasized in the resulting synthesized image.

Further, in the above case, adjustment of gradation values is carried out by uniformly multiplying background gradation values corresponding to respective pixels by a predetermined factor. That is, background gradation values can be adjusted with ease only by uniformly multiplying the same by the predetermined factor. For instance, in the example of the FIG. 18 synthesized image PGA, background gradation values (mask numbers in this example) CPB01 to CPB04 of the FIG. 17 synthesized image PG0 are reduced by half (multiplied by 0.5 (50%)). Although in the present embodiment, it is difficult to finely adjust background gradation values since only five gradation values of 0 to 4 are provided for efficiency of description, in the more actual or general case of a gradation image with 64 or 256 gradation levels, it is possible to effect more delicate adjustment of gradation values (gradation values can be adjusted in the range of approximately 44% to 75% 35 to 75%, depending on types of background images).

In the present embodiment, the background image is a color image, whose background gradation values contain a plurality of basic color gradation values as gradation values for a plurality of basic colors. The plurality of basic colors include three primary colors. Adjustment of background gradation values is carried out on each of the plurality of basic color gradation values, so that even if the background image is a color image, it is possible to easily adjust background gradation values and easily set the same as adjusted background gradation values. In the second synthesized image-forming method of the present embodiment, adjustment of background gradation values is uniformly carried out on the plurality of basic color gradation values, as in FIG. 18 showing results of adjustment on the basic color gradation values in FIG. 17. That is, by uniformly adjusting each of the plurality of basic color gradation values, it becomes possible to more easily adjust gradation values of a background image and set the same as adjusted background gradation values, even if the image is a color image. Further, it is also possible to separately adjust the plurality of basic color gradation values to change the colors, thereby creating a color having a delicate shade, such as sepia, and a clear pale color.

Further, according to the tape printing apparatus 1, as described above with reference to FIG. 23, and as clearly shown by the first and second synthesized image-forming methods, it is possible to select whether or not adjustment of background gradation values are carried out and form synthesized image data based on adjusted background image data, only when the adjustment is selected to be effected (by the second synthesized image-forming method). In other words, adjustment of background gradation values (second synthesized image-forming method) can be selected, and when the same is not selected, it is possible to form a synthesized image by other methods, such as the above-mentioned first synthesized image-forming method and the third synthesized image-forming method, described hereinafter, as well as stop forming a synthesized image. Thus, the operability and functionality of the apparatus in forming images can be enhanced.

As described above, according to the second synthesized image-forming method, a plurality of candidates for a background image are stored. Then, one of them is selected as a background image and synthesized with a main image after each pixel thereof is reduced in density, whereby a synthesized image is formed which is comprised of the main image and the background image synthesized therewith. Therefore, while making use of an existing image as the background image, a synthesized image with excellent appearance can be formed by synthesizing a main image with the background image having a suitable density for the same.

Next, in order to select and set the third synthesized image-forming method, the selection key 323 is depressed in the state of the option "AUTO CHR COLOR (automatic character color adjustment)" being highlighted for selection (T122). This option is one of the options displayed on the "SYN-ADJST" (synthesis-adjustment) selection screen (T121 to T123) at the second hierarchical level, described above with reference to FIG. 23. When the selection key 323 is depressed, the mode of the automatic character color adjustment (i.e. a mode which uses the third synthesized image-forming method for automatically adjusting (setting) a character color) is selected and set (S23 in FIG. 3), followed by returning to the original "ILLST" (illustration) selection screen at the first hierarchical level (T124: the same as T12). When the selection key 323 is depressed by the user in the state of the option "END ?" being highlighted for selection (T13), the screen returns to the original text entry screen (T14: the same as T10).

Referring to FIG. 3, after the above-mentioned settings (S20) have been completed, it is determined (S30) whether or not the mode of the automatic character color adjustment is set. In the present case, this mode is set, and hence after a character color corresponding to the background image is set at step S100, the print instruction (S70) wait state is enabled and maintained. At this time point, the elementary shape image data, not shown, of each of the FIG. 19 image elements (main image and background image), the color palette data CPCB and the color palette data CPB01 to CPB03 (the same as CPB01 to CPB03 in FIG. 17) are prepared, so that when printing is instructed by the user (S70), the print image PGB shown in FIG. 19 is formed and printed (S80, S90), followed by terminating the image-forming/printing process (silo).

In the third synthesized image-forming method, similarly to the first and the second synthesized image-forming methods, a plurality types of (image data representative of) images as candidates for (background image data representative of) background images are stored in advance in the background Image data area 248 for use in selection of a desired one of the plurality types of candidates (the FIG. 3 background image-selecting process (S22)). Further, the main shape image data is formed by the FIG. 4 main image-forming process (S80) (since the FIG. 19 color palette data CPB01 to CPB04 are the same as in the FIG. 17, the background image data is the same as the data formed by the first synthesized image-forming method).

Figure 19:
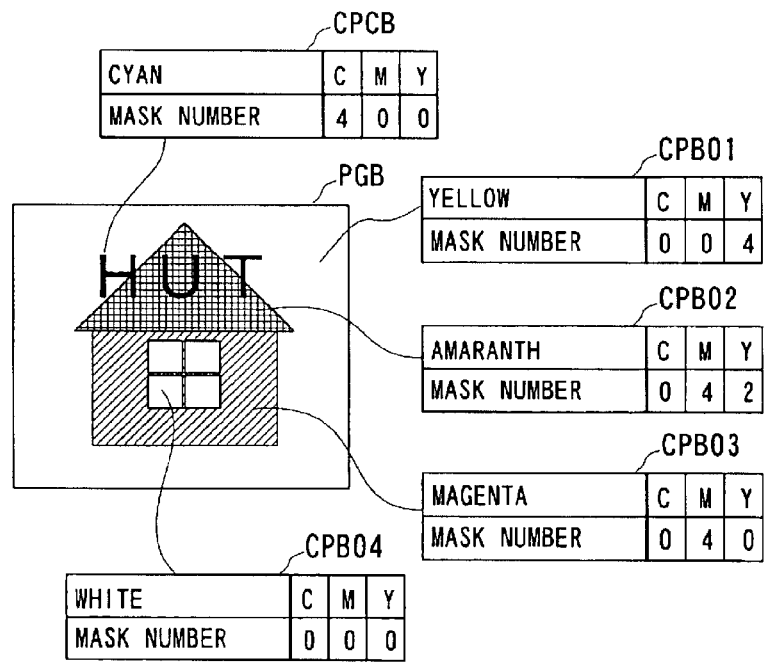
FIG. 19 is a diagram similar to FIG. 13, which illustrates a synthesized image formed by synthesizing the FIG. 15A main image with the FIG. 15B background image by a third synthesized image-forming method.

However, as is clear from comparison of the color pallet data CPC0 of the FIG. 17 main image with the color palette data CPCB of the FIG. 19 main image, instead of setting a character color (FIG. 15A color palette data CPC0, for instance) at step S40 in the FIG. 3 image-forming/print process, at step S100 in the same, a character color corresponding to the background image is set, such that (character color data, i.e. candidate for main image gradation value data defining) a character color corresponding to (background image data representative of) the selected background image is set as (color palette data CPCB (main image gradation value data) defining) the character color of the main image (character string image). In other words, (character color data defining) a character color preset as a color, which will not be spoiled by synthesis and attractive, matching with the color of the background image selected (color palette data defining background gradation values of the background image: the FIG. 15B color palette data CPB01 to CPB04) is set as the color (main image gradation value data representative of main image gradation values: for instance, color palette data CPCB of the FIG. 19 main image) of the main image (character string image).

Then, based on main image data having the above main image gradation value data (color palette data CPCB) and main shape image data for representation of the main image, and the background image data, synthesized image data representative of a synthesized image formed by synthesizing the main image with the background image is produced (by the image-synthesizing process (S85) in FIG. 4), while causing the adjustment of gradation values of each pixel of the main image and the background image to be reflected on the synthesized image through the dithering (S82, S84 or S87 in FIG. 4).

That is, according to the third synthesized image-forming method, similarly to the first and second synthesized image-forming methods, a plurality types of existing images are stored as candidates for a background image, and a desired one of the images is selected for use as the background image, whereby a synthesized image can be formed by synthesizing a main image with the background image. On the other hand, differently from the first synthesized image-forming method, a plurality of character colors (candidates for sets of main image gradation values) are stored in a manner respectively correlated to a plurality of types of candidates for the background image, and a character color (candidate for a set of main image gradation values) corresponding to the background image is set as the color (main image gradation values) of the main image. Hence, by storing each color suitable for the color of each candidate for the background image as a character color (candidate for the set of main image gradation values) corresponding to the candidate for the background image, an attractive synthesized image can be formed by synthesizing a main image having a color suitable for the color of the background image with the background image.

In the above case, whether or not (character color data defining) a character color corresponding to (background image data representative of) a background image is set as the color (main image gradation value data) of a main images, that is, whether or not the automatic character color adjustment i.e. automatic setting of main image gradation values is to be executed, can be selected and set by selecting or not selecting the option "AUTO CHR COLOR (automatic character color adjustment)", described above with reference to FIG. 23. When the option "AUTO CHR COLOR (automatic character color adjustment)" (for automatically setting main image gradation values) is selected, the character color-setting process (S100) in FIG. 3 is carried out (candidate for a set of main image gradation values) corresponding to a background image is set as main image gradation value data. In other words, it is possible to select whether or not the color (main image gradation values) of a main image is to be automatically set. If the mode of automatic character color adjustment is not selected, the main image gradation values can be set manually, similarly to the first synthesized image-forming method, for instance. Alternatively, it is possible to set the main image gradation values to default values or stop forming a synthesized image, thereby enhancing the operability and functionality of the apparatus in image forming.

As described above, according to the third synthesized image-forming method, a plurality of types of color images are stored as candidates for a background image. Then, one of them is selected as a background image, and after the color of a main image is set in accordance with the selected background image, the main image and the background image are synthesized with each other to thereby create a synthesized image. Therefore, while making use of an existing image as a background image, a synthesized image with excellent appearance can be formed by synthesizing the background image with a main image having a color matching with the color of the background image.

Although in the above embodiment, examples of forming images for printing, that is, examples of creating print images in the tape printing apparatus 1 are described, the image forming method and device according to the invention can be applied to image processing for forming display images to be displayed on the display 4. Further, although in the above printing operation, the colors C, M, and Y are used as three primary colors, and the colors C, M, Y, and K are used as the four basic colors, it is preferred that for purposes of display, R (red), G (green) and B (blue) are used as three primary colors (basic colors) for the image forming. Since colors can be represented by so-called additive color mixing process, the image forming in this case is suitable for a case where illuminants, such as CRTs, liquid crystal displays, and plasma displays, emit light for representation of colors. In addition, in this case, the mixture (mixed color) of colors R, G, and B results in white.

Although in the above embodiments of the present invention, a printing apparatus of an ink jet type is employed by way of example, this is not limitative, but the invention can be applicable to a thermal type, a laser type and the like. Further, so long as an existing image is employed as a background image to form a synthesized image by synthesizing a main image with the background image, the invention can be applied to any device, such as a printing apparatus and a display device, both of a general type, and to image processing for forming images for any possible purposes.

It is further understood by those skilled in the art that the foregoing is a preferred embodiment of the invention, and that various changes and modifications may be made without departing from the spirit and scope thereof.

What is claimed is:

1. An image forming method of forming a main image and a background image serving as a background of said main image by using colors each defined by a set of n-valued basic color gradation values each having any one of n possible values(n is an integer which is equal to or larger than 3) and defining a gradation value of a corresponding one of a predetermined set of basic colors, and synthesizing said main image and said background image, to thereby form a synthesized image, the image forming method comprising the steps of:

storing a plurality of different image data items respectively representative of candidates for said background image, as background image data candidates;

storing a plurality of different sets of said n-valued basic color gradation values, said different sets corresponding to respective ones of said background image data candidates, as candidates for a main image gradation value set of said n-valued basic color gradation values commonly applied to all valid pixels of said main image;

setting an arbitrary one of said background image data candidates to a background image data item representative of said background image;

setting, out of said candidates for said main image gradation value set, one corresponding to said background image represented by said background image data item to said main image gradation value set;

forming a main shape image data item representative of a main shape image forming a shape of said main image by assigning a validity-indicative one of predetermined two values to all pixels of said main shape image as said all valid pixels of said main image, and assigning an invalidity-indicative one of said predetermined two values to the remaining pixels of said main image; and forming a synthesized image data item representative of said synthesized image by synthesizing said main image and said background image based on a main image data item representative of said main image and said background image data item, said main image color item having said main image gradation value set and said main shape image data item.

2. An image forming method according to claim 1, wherein said background image data candidates include image data items each representative of a dot image formed by inputting data of dots as desired.

3. An image forming method according to claim 1, wherein the step of forming said main shape image data item comprises the steps of:

inputting text data as a source of said main image; and converting said text data into image data based on predetermined font data to thereby form said main shape image data item.

4. An image forming method according to claim 3, wherein said predetermined font data is outline font data.

5. An image forming method according to claim 1, wherein said plurality of basic colors include three primary colors, said three primary colors being cyan, magenta, and yellow.

6. An image forming method according to clam 5, wherein said plurality of basic colors include a basic color corresponding to a mixes color of said thee primary colors.

7. An image forming method according to claim 1, wherein said synthesized image is formed as a print image to be printed on a printing object.

8. An image forming method according to claim 7, wherein said printing object is a tape.

9. An image forming method according to claim 7, wherein said print image is printed by an ink jet printing method.

10. An image forming method according to claim 1, wherein said plurality of basic colors include three primary colors, said three primary colors being red, green and blue.

11. An image forming method according to claim 1, wherein said synthesized image is formed as a display age to be displayed on a display screen.

12. An image forming method according to claim 1, further including the steps of:
   determining whether or not an automatic main gradation value adjustment should be executed to automatically set said one corresponding to said background image represented by said background image data item to said main image gradation value set; and
   wherein the step of setting said one corresponding to said background image represented by said background image data item to said main image gradation value set includes executing said automatic main gradation value adjustment to automatically set said one corresponding to said background image represented by said background image data item to said main image gradation value set when it is determined that said automatic main gradation value adjustment should be executed.

13. An image forming device for forming a main image and a background image serving as a background of said main image by using colors each dewed by a set of n-valued basic color gradation values each having my one of a possible values (n is an integer which is equal to or larger than 3) and dewing a gradation value of a corresponding one of a predetermined set of basic colors, and synthesizing said main image and said background image, to thereby form a synthesized image,
   the image forming device comprising:
   background image data candidate storage means for storing a plurality of different image data items respectively representative of candidates for said background image, as background image data candidates;
   main image gradation value set candidate storage means for storing a plurality of different sets of said n-valued basic color gradation values, said different sets corresponding to respective ones of said background image data candidates, as candidates for a main image gradation value set of said n-valued basic color gradation values commonly applied to all valid pixels of said main image;
   background image-setting means setting an arbitrary one of said background image data candidates to a background image data item representative of said background image;
   main image gradation value set-setting means for setting, out of said candidates for said main image gradation value set, one corresponding to said background image represented by said background image data item to said main image gradation value set;
   main shape image data-forming means for forming a main shape image data item representative of said main image by assigning a validity-indicative one of predetermined two values to all pixels of a main shape image forming a shape of said main image as said all valid pixels of said main image, and assigning an invalidity-indicative one of said predetermined two values to the remaining pixels of said main image; and
   synthesized image data-forming means for forming a synthesized image data item representative of said synthesized image by synthesizing said main image and said background image based on a main image data item representative of said main image and said background image data item, said main image data item having said main image gradation value set and said main shape image data item.

14. An image forming device according to claim 13, wherein said background image data candidates include data items each representative of a dot image formed by inputting data of dots as desired.

15. An image forming device according to claim 13, including font storage means for storing predetermined font data, wherein said main shape image data-forming means comprises:
   text data-inputting means for inputting text data as a source of said main image; and
   conversion means for converting said text data into image data based on predetermined font data to thereby form said main shape image data item.

16. An image forming device according to claim 15, wherein said predetermined font data is outline font data.

17. An image forming device according to claim 13, wherein said plurality of basic colors include three primary colors, said three primary colors being cyan, magenta yellow.

18. An image forming device according to claim 17, wherein said plurality of basic colors include a basic color corresponding to a mixed color of said three primary colors.

19. An image forming device according to claim 13, wherein, said synthesized image is formed as a print image to be printed on a printing object.

20. An image forming device according to claim, 19, wherein said printing object is a tape.

21. An image forming device according to claim 19, wherein said print image is printed by an ink jet printing method.

22. An image forming device according to claim 13 wherein said plurality of basic colors include three primary colors, said three primary colors being red, green, and blue.

23. An image forming device according to claim 13, wherein said synthesized image is formed as a display image to be displayed on a display screen.

24. An image forming device according to claim 13, further including automatic ma gradation value adjustment-determining means for determining whether or not an automatic main gradation value adjustment should be executed to automatically set said one corresponding to said background image represented by said background image data item to said main image gradation value set; and
   wherein said main image gradation value set-setting means executes said automatic main gradation value adjustment to automatically set said one corresponding to said background image represented by said background image data item to said main image gradation value set when it is determined that said automatic main gradation value adjustment should be executed.

* * * * *